United States Patent
Hotta

(10) Patent No.: US 11,554,641 B2
(45) Date of Patent: *Jan. 17, 2023

(54) VEHICLE AIR CONDITIONER

(71) Applicant: Toyota Jidosha Kabushiki Kaisha, Toyota Aichi-ken (JP)

(72) Inventor: Masashi Hotta, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

This patent is subject to a terminal disclaimer.

(21) Appl. No.: 16/911,870

(22) Filed: Jun. 25, 2020

(65) Prior Publication Data

US 2020/0406719 A1 Dec. 31, 2020

(30) Foreign Application Priority Data

Jun. 28, 2019 (JP) .............. JP2019-121192

(51) Int. Cl.
 *B60H 1/32* (2006.01)
 *B60H 1/00* (2006.01)

(52) U.S. Cl.
 CPC ......... *B60H 1/3227* (2013.01); *B60H 1/3229* (2013.01); *B60H 1/32331* (2019.05); *B60H 2001/00242* (2013.01); *B60H 2001/3289* (2013.01)

(58) Field of Classification Search
 CPC .............. B60H 1/3227; B60H 1/32331; B60H 1/3229; B60H 1/00535; B60H 2001/00242; B60H 2001/00214; F24F 1/40; F24F 2013/225
 See application file for complete search history.

(56) References Cited

U.S. PATENT DOCUMENTS

| | | | | |
|---|---|---|---|---|
| 2,481,135 A | * | 9/1949 | Maness, Jr. | ............... F01P 9/02 165/115 |
| 3,926,000 A | * | 12/1975 | Scofield | ................. B60K 11/02 62/506 |
| 4,516,406 A | * | 5/1985 | Gentry | ................. B60H 1/3227 62/183 |
| 5,081,912 A | | 1/1992 | Clenet | |

(Continued)

FOREIGN PATENT DOCUMENTS

| CN | 202144193 U | 2/2012 |
|---|---|---|
| CN | 205001052 U | 1/2016 |

(Continued)

OTHER PUBLICATIONS

Non-Final Office Action dated Aug. 31, 2021 in U.S. Appl. No. 16/911,885, filed Jun. 25, 2020.

(Continued)

*Primary Examiner* — Christopher R Zerphey
(74) *Attorney, Agent, or Firm* — Dinsmore & Shohl LLP

(57) ABSTRACT

A vehicle air conditioner installed in a vehicle includes: a condenser that causes heat exchange between a coolant and outside air; at least one spray nozzle that sprays water to a portion near the condenser; and a water tank that is in communication with the spray nozzle through an output hose, and stores the water to be sprayed. The at least one spray nozzle is disposed at a higher level than the water tank.

4 Claims, 16 Drawing Sheets

(56) References Cited

U.S. PATENT DOCUMENTS

| | | | | |
|---|---|---|---|---|
| 5,211,136 | A * | 5/1993 | Dacus | F01P 9/02 123/41.01 |
| 5,456,089 | A * | 10/1995 | O'Brien | B60H 1/3227 165/149 |
| 6,301,909 | B1 * | 10/2001 | Hayasaka | B60H 1/24 62/323.3 |
| 6,415,620 | B1 | 7/2002 | Ferdows | |
| 6,658,872 | B1 * | 12/2003 | James | F28D 5/00 62/305 |
| 2004/0154326 | A1 | 8/2004 | Hosokawa | |
| 2004/0221596 | A1 | 11/2004 | Hille et al. | |
| 2009/0079098 | A1 | 3/2009 | Ezra | |
| 2009/0199582 | A1 | 8/2009 | Justin | |
| 2010/0307176 | A1 | 12/2010 | Zeweke et al. | |
| 2018/0264915 | A1 | 9/2018 | Jeong et al. | |
| 2018/0290520 | A1 | 10/2018 | Hipp-Kalthoff et al. | |
| 2019/0118612 | A1 | 4/2019 | Ferrer et al. | |
| 2019/0270419 | A1 | 9/2019 | Martin et al. | |
| 2019/0291666 | A1 | 9/2019 | Martin et al. | |
| 2020/0406702 | A1 * | 12/2020 | Hotta | B60H 1/00028 |
| 2020/0406707 | A1 * | 12/2020 | Hotta | B60H 1/3227 |
| 2020/0406718 | A1 * | 12/2020 | Hotta | B60H 1/3227 |
| 2020/0406720 | A1 * | 12/2020 | Hotta | B60H 1/3227 |

FOREIGN PATENT DOCUMENTS

| | | |
|---|---|---|
| CN | 206664210 U | 11/2017 |
| CN | 208704134 U | 4/2019 |
| DE | 602004002862 T2 | 5/2007 |
| DE | 102013110562 A1 | 3/2015 |
| JP | S63034975 Y | 9/1988 |
| JP | H03-51610 U | 5/1991 |
| JP | H06-064029 U | 9/1994 |
| JP | H09207542 A | 8/1997 |
| JP | 2000-094947 A | 4/2000 |
| JP | 2008-273261 A | 11/2008 |
| JP | 2009-035206 A | 2/2009 |
| JP | 2010-173357 A | 8/2010 |
| KR | 1998-0060241 A | 10/1998 |

OTHER PUBLICATIONS

Final Office Action dated Mar. 2, 2022 in U.S. Appl. No. 16/911,885, filed Jun. 25, 2020.

Non-Final Office Action dated Mar. 4, 2022 for U.S. Appl. No. 16/912,814, filed Jun. 26, 2020.

Non-Final Office Action dated Jun. 1, 2022 to U.S. Appl. No. 16/911,885, filed Jun. 25, 2020.

Final Office Action dated Jun. 7, 2022 to U.S. Appl. No. 16/912,814, filed Jun. 26, 2020.

Notice of Allowance dated Oct. 5, 2022 in U.S. Appl. No. 16/911,885, filed Jun. 25, 2020.

Non-Final Office Action dated Sep. 29, 2022 to U.S. Appl. No. 16/909,105, filed Jun. 23, 2020.

Corrected Notice of Allowance dated Oct. 19, 2022 to U.S. Appl. No. 16/911,885, filed Jun. 25, 2020.

* cited by examiner

VEHICLE AIR CONDITIONER

CROSS REFERENCE TO RELATED APPLICATION

This application claims priority to Japanese Patent Application No. 2019-121192 filed on Jun. 28, 2019, which is incorporated herein by reference in its entirety including the specification, claims, drawings, and abstract.

TECHNICAL FIELD

This specification discloses a vehicle air conditioner mounted on a vehicle.

BACKGROUND

Conventionally, vehicles equipped with an air conditioner have been widely known. As a matter of course, the vehicle air conditioner is driven by the power from a vehicle battery installed in the vehicle. Conventionally, there has been demand for reduction of power consumption of the vehicle air conditioner, in consideration of the limited power of the vehicle battery.

In view of this, some proposed air conditioners employ the following configuration to reduce the power consumed during cooling. Specifically, mist (water) is injected to a portion near a compressor performing heat exchange between a coolant and outside air. With the heat of vaporization of the mist, cooling efficiency of the coolant is improved, along with that of the air conditioner.

For example, JP 9-207542 A discloses an integrated air conditioner for a vehicle including a spray nozzle that sprays condensed water, generated by an evaporator, to a condenser. In JP 9-207542 A, a compressor, a condenser, a throttle valve, the evaporator, the spray nozzle, and the like are all housed in the same case to be unitized. The unitized air conditioner is disposed on the outdoor ceiling portion of the vehicle. With the mist injected to the compressor as in JP 9-207542 A, further improvement of the cooling efficiency can be achieved.

However, in JP 9-207542 A, the spray nozzle for spraying water is disposed below the condensed water collecting plate for collecting condensed water. In this case, the condensed water may leak from the spray nozzle due to gravity, after the spraying has been stopped. As a result, there has been a risk of failure to secure a sufficient amount of water when it is needed. As a result, the cooling efficiency is compromised.

Of course, a valve may be additionally provided upstream of the spray nozzle so that such leakage can be prevented. However, provision of such an additional valve results in an increase in the number of parts and more complicated control.

In view of this, the present specification discloses a vehicle air conditioner with which sufficient cooling efficiency can be more reliably maintained with a simple configuration.

SUMMARY

A vehicle air conditioner installed in a vehicle disclosed in this specification includes: a condenser that causes heat exchange between a coolant and outside air; at least one spray nozzle that sprays water to the outside air flowing to the condenser; and a water tank that is in communication with the spray nozzle through an output hose, and stores the water to be sprayed. The at least one spray nozzle is disposed at a higher level than the water tank.

With this configuration, it is possible to effectively prevent the water in the water tank from leaking from the spray nozzle due to gravity, without providing a valve on the upstream side of the spray nozzle. Thus, the water is less likely to run short, and thus the water can be sprayed when necessary. As a result, sufficient cooling efficiency can be reliably maintained with a configuration with no valve.

In this case, the vehicle air conditioner may further include a supporting frame that surrounds an edge of the condenser to support the condenser, and the at least one spray nozzle may be fixed to the supporting frame.

With this configuration, a complicated mechanism for fixing the spray nozzle is not required, whereby the vehicle air conditioner can have a simple configuration.

The at least one spray nozzle may be disposed at a position further on a front side than the condenser, while being oriented to have a spraying axis extending in parallel with a front surface of the condenser.

With such a configuration, the sprayed mist (water) is likely to spread in the space in front of the condenser instead of immediately hitting the condenser. As a result, the front surface of the condenser can be uniformly cooled, whereby the coolant cooling efficiency of the condenser can be improved.

The vehicle air conditioner may further include a front side air conditioning unit for air conditioning on a front side of a passenger compartment, and a rear side air conditioning unit for air conditioning on a rear side of the passenger compartment. The front side air conditioning unit may include the condenser and the at least one spray nozzle that are provided in a front side accommodation space in a lower front portion of the vehicle, and may further include the water tank provided under a floor of the vehicle, and the rear side air conditioning unit may include the condenser and the at least one spray nozzle that are provided in a rear side accommodation space in a lower rear portion of the vehicle, and may further include the water tank provided under the floor of the vehicle.

With the water tank provided under the floor of the vehicle, the water tank can be disposed below the spray nozzle, whereby the dead space of the vehicle can be effectively utilized.

With the vehicle air conditioner disclosed in this specification, wasteful leakage of the water to be sprayed can be prevented without providing a valve, whereby sufficient cooling efficiency can be more reliably maintained with a simple configuration.

BRIEF DESCRIPTION OF DRAWINGS

Embodiment(s) of the present disclosure will be described based on the following figures, wherein.

DESCRIPTION OF EMBODIMENTS

Figure 1:
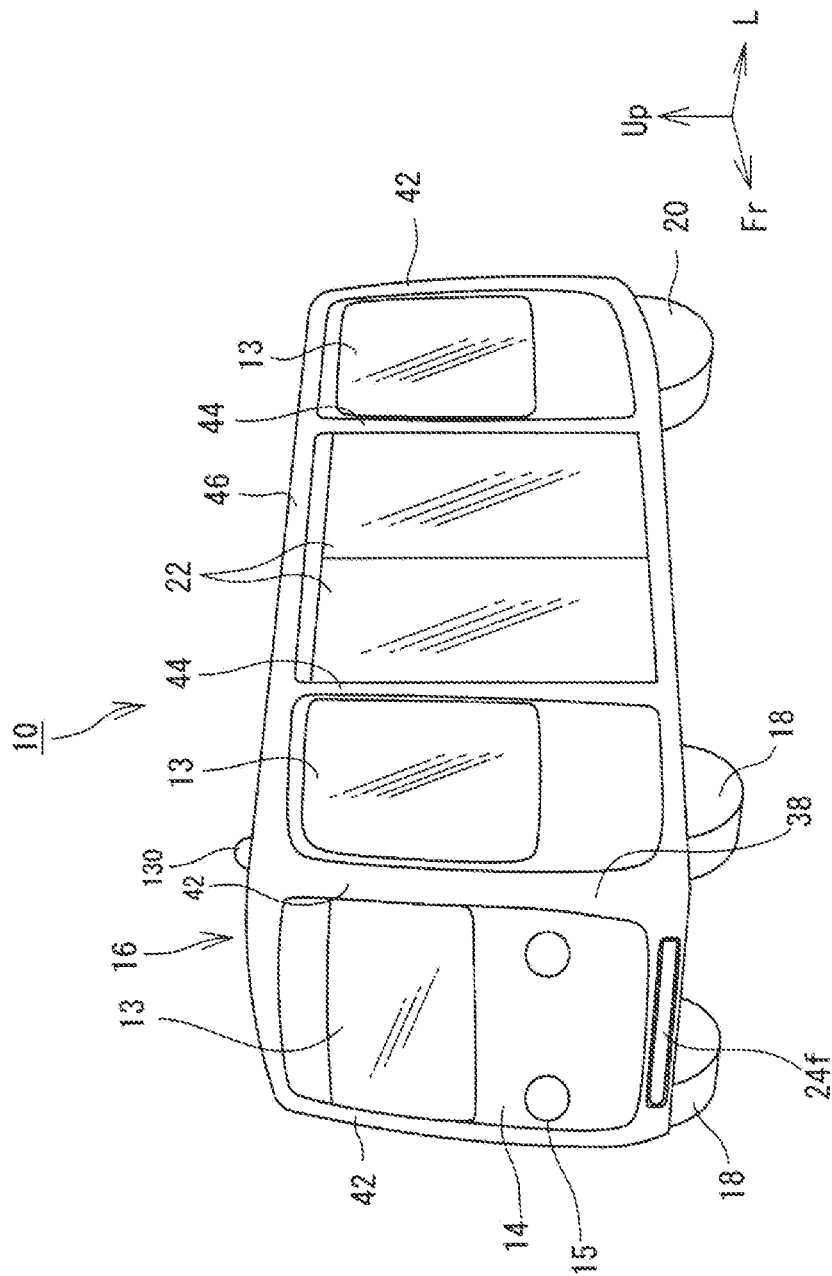
FIG. 1 is a perspective view of a vehicle as viewed from the outside.

Hereinafter, a configuration of a vehicle 10 equipped with an air conditioner 50 will be described with reference to the drawings. In the drawings referred to in the description below, "Fr", "Up", and "L" respectively indicate a vehicle front side, a vehicle upward side, and a left side in a vehicle width direction.

<Overall Configuration>

Figure 2:
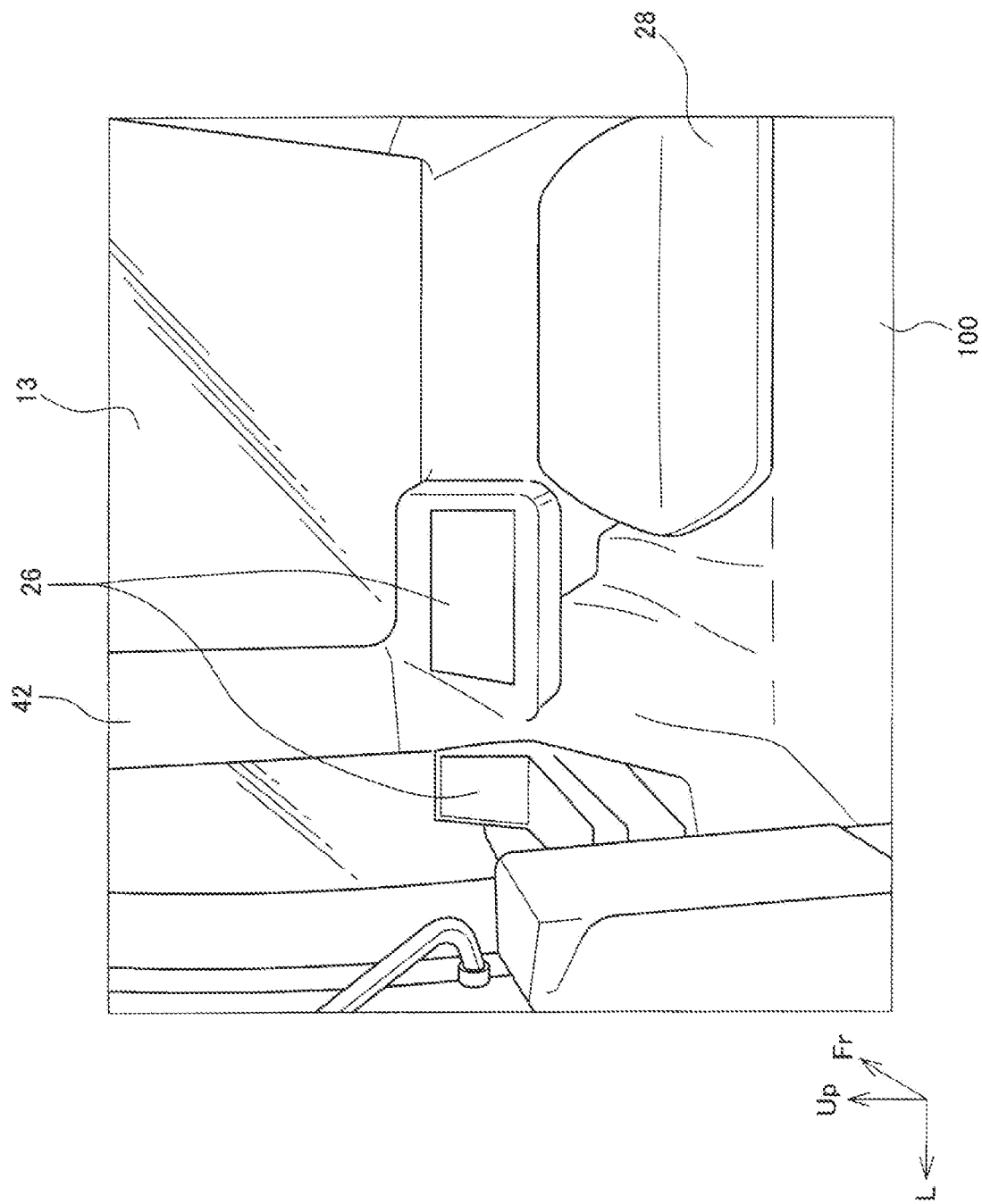
FIG. 2 is a perspective view of the interior of a passenger compartment as viewed in a direction from the center of the vehicle toward the front side of the vehicle.
Figure 3:
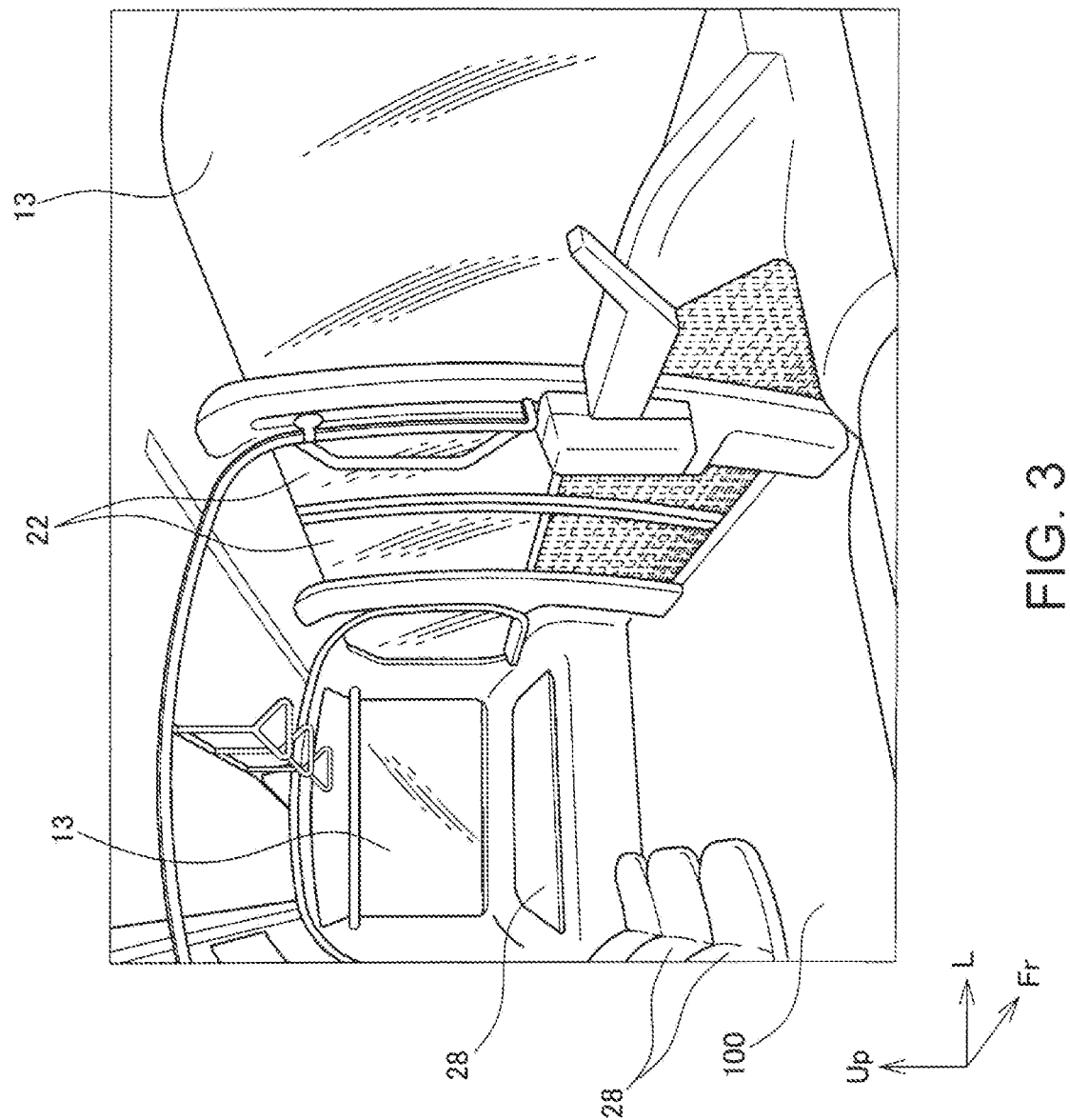
FIG. 3 is a perspective view of the interior of the passenger compartment as viewed in a direction from a front portion of the vehicle toward the rear side of the vehicle.
Figure 4:
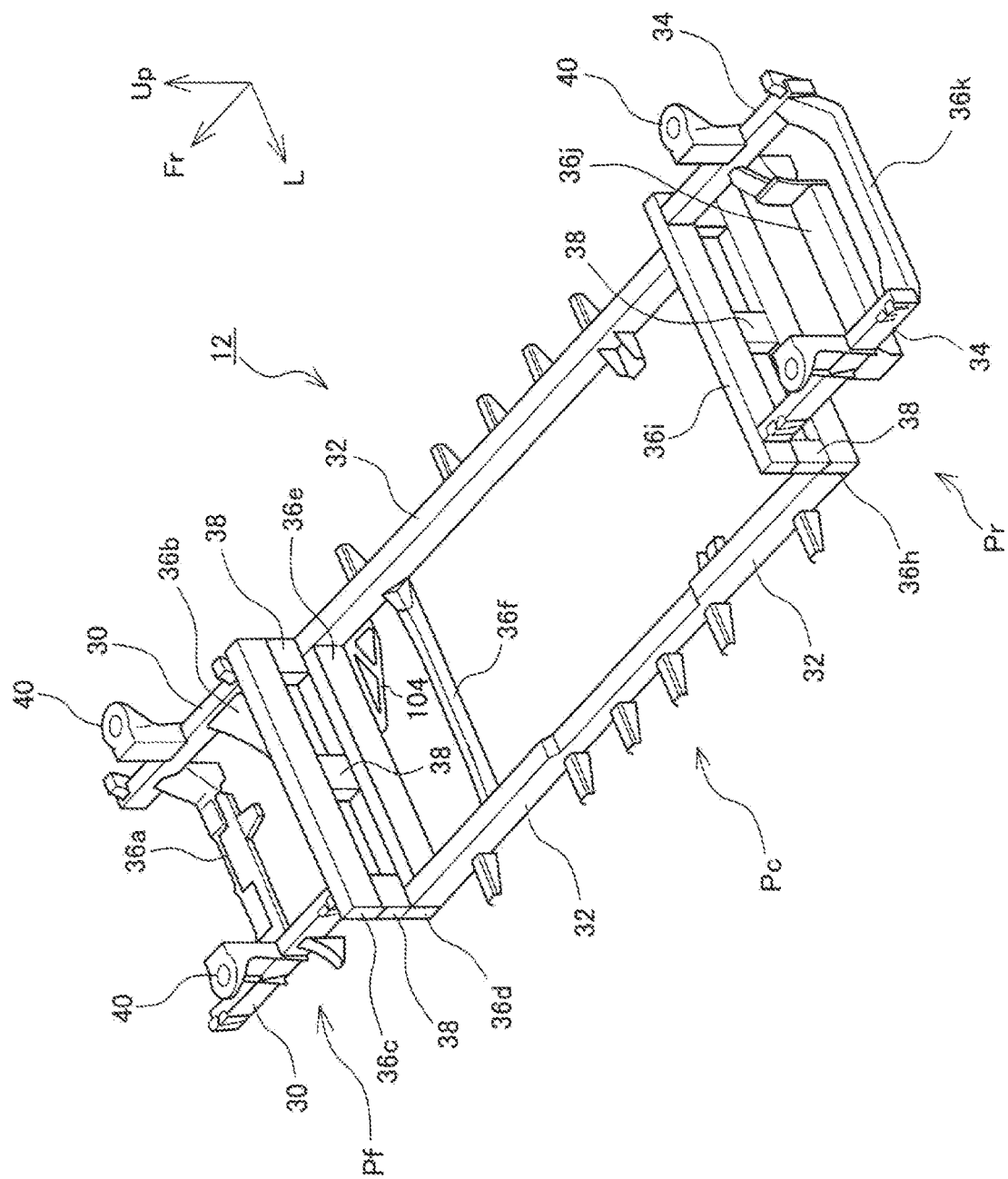
FIG. 4 is a rear perspective view of a main frame of the vehicle.
Figure 5:
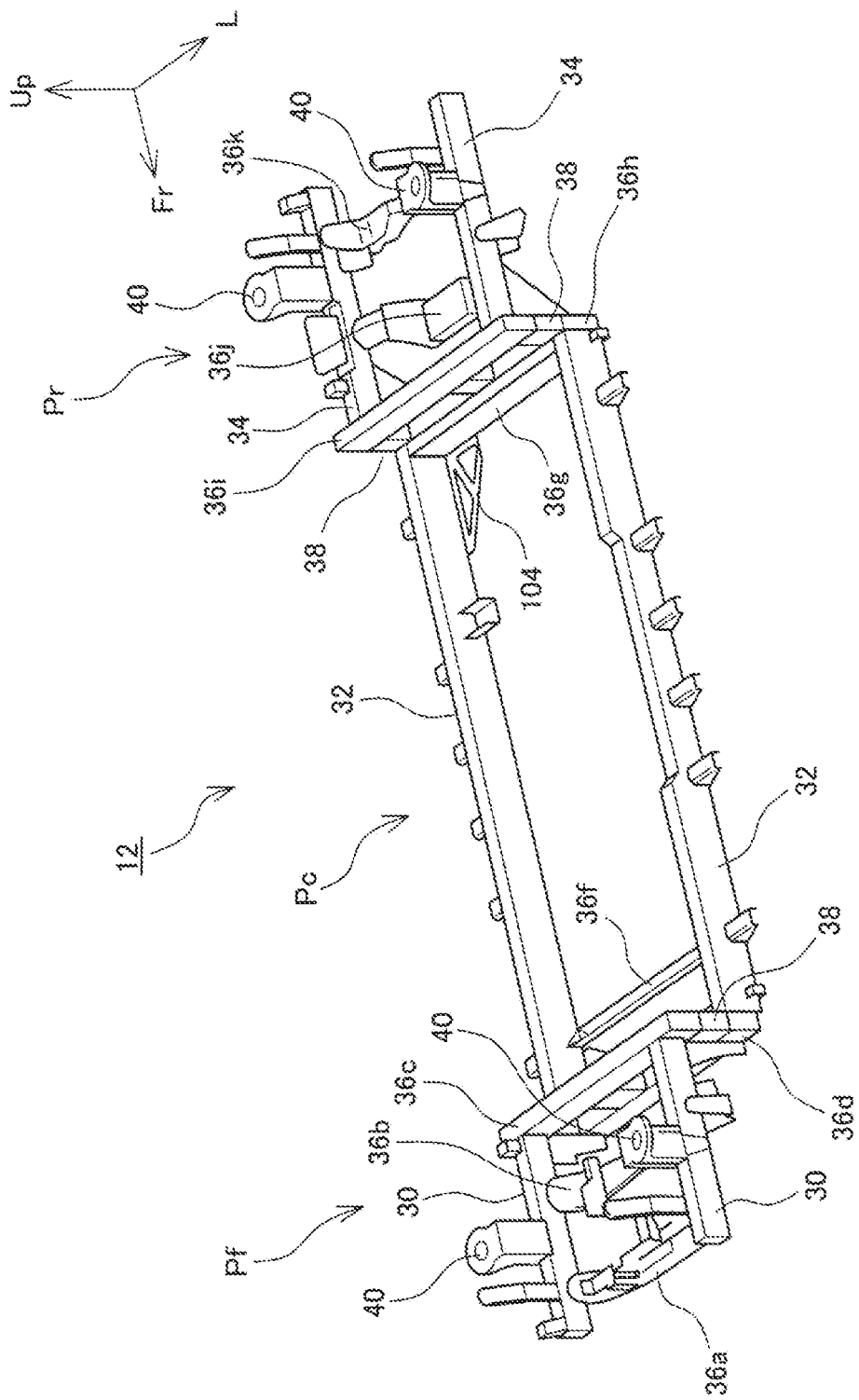
FIG. 5 is a side perspective view of the main frame of the vehicle.

First of all, an overall configuration of the vehicle 10 will be briefly described with reference to FIGS. 1 to 5. FIG. 1 is a perspective view of the vehicle 10 as viewed from the outside. FIG. 2 is a perspective view illustrating the interior of a passenger compartment as viewed in a direction from the center of the vehicle toward the front side of the vehicle. FIG. 3 is a perspective view illustrating the interior of the passenger compartment as viewed in a direction from a front portion of the vehicle toward the rear side of the vehicle. FIGS. 4 and 5 are perspective views illustrating a main frame 12 of the vehicle 10.

The vehicle 10 is used as a bus for transporting passengers while autonomously traveling along a predetermined route in a predefined site. Thus, the vehicle 10 repeatedly stops and starts relatively frequently, and opens and closes a door 22 relatively frequently for passengers to get on and off. The vehicle 10 travels at a relatively low speed (for example, not faster than 30 km/h).

However, a use mode of the vehicle 10 disclosed in this specification can be changed as appropriate. For example, the vehicle 10 may be used as a mobile business space. For example, the vehicle 10 may be used as a store such as a retail store that displays and sells various products, or as a food van that cooks and provides food and drink. As another mode, the vehicle 10 may be used as an office for office work, meetings with customers, and the like. Furthermore, the vehicle 10 may be used as a taxi, a bus, or a transportation vehicle for transporting customers and luggage. Furthermore, the usage scene of the vehicle 10 is not limited to business. For example, the vehicle 10 may be used as a personal transportation. Furthermore, the traveling pattern and traveling speed of the vehicle 10 may be changed as appropriate.

The vehicle 10 is an electric vehicle having a drive motor serving as a prime mover. The vehicle 10 is equipped with a main battery 106 (see FIG. 15) for supplying electric power to the drive motor. The air conditioner 50 described later is driven by the electric power from the main battery 106. The main battery 106 is a chargeable/dischargeable secondary battery, and is periodically charged with external power. Note that the vehicle 10 is not limited to an electric vehicle and may be another type of vehicle so long as it has a battery that supplies electric power to the air conditioner 50. For example, the vehicle 10 may be an engine vehicle equipped with an engine as a prime mover, or a hybrid vehicle equipped with an engine and a drive motor as prime movers. Further, the vehicle 10 may be a fuel cell vehicle that drives a drive motor with electric power generated by fuel cells.

Further, the vehicle 10 can travel by autonomous driving as described above. The term "autonomous driving" as used herein means that the vehicle 10 performs almost all of the dynamic driving tasks, and corresponds to any one of Level 3 to Level 5 defined by the Society of Automotive Engineers (SAE) of the US, for example. Level 3 is a driving mode in which all dynamic driving tasks are automated in a specific place such as an expressway, but an operation by a driver is required in an emergency. Level 4 is a driving mode in which all dynamic driving tasks are automated only in specific places, and emergency response is automatically processed. Level 5 is a driving mode known as "full driving automation" meaning that the driving can be automated under any kind of condition, without being limited by location or the like. Note that the vehicle 10 may have a driving support function to be in charge of a part of the dynamic driving tasks, instead of the autonomous driving function. For example, "drive assistance" corresponds to Level 1 or Level 2 defined by SAE. Level 1 means that the vehicle 10 supports either one of steering operation and acceleration/deceleration. Level 2 means that the vehicle 10 supports driving while controlling both steering operation and acceleration/deceleration.

Such autonomous driving or driver assistance is enabled with one or more peripheral information sensors 130 provided to the vehicle 10. The peripheral information sensor 130 detects information about the periphery of the vehicle 10. The peripheral information sensor 130 is not particularly limited so long as it is a sensor that can detect peripheral information. Thus, the peripheral information sensor 130 may be, for example, a camera (a visible light camera, an infrared camera, or the like) that captures a peripheral image. Furthermore, the peripheral information sensor 130 may be a laser sensor (for example, a millimeter wave radar) that detects an object using radio waves. Furthermore, the peripheral information sensor 130 may be an optical sensor (for example, an infrared sensor or a LiDAR) that detects an object using light. In this example, at least one of the peripheral information sensors 130 is mounted on the outer surface of the ceiling of the vehicle 10.

As illustrated in FIG. 1, the vehicle 10 has no hood or trunk, and has a substantially box-shaped (cuboid) outer shape with a front end surface and a rear end surface standing substantially vertically. A pair of front wheels 18 and a pair of rear wheels 20 are respectively provided near the front end and the rear end of the vehicle 10. Large windows 13 are provided on side surfaces of the vehicle 10. Furthermore, a double-sided sliding door 22 that slides in the forward and rearward direction of the vehicle to open and close is provided at the center of the left side surface of the vehicle 10. In other words, in this example, the door 22 is formed on one of two side surfaces in the vehicle width direction, and not on the other side surface.

The front end surface of the vehicle 10 is provided with a window 13 functioning as a windshield, and a lamp arrangement portion 14 disposed below the window 13. Signal lamps 15 for notifying a person outside the vehicle of the presence and behavior of the vehicle by light are disposed in the lamp arrangement portion 14. At the lower end of the lamp arrangement portion 14, a front grill 24*f* for guiding outside air into the vehicle is provided. The rear end surface of the vehicle 10 has substantially the same configuration as the front end surface of the vehicle. Specifically, a window 13 and a lamp arrangement portion 14 are arranged vertically, and a rear grill 24*r* (not visible in FIG. 1) is provided at the lower end of the lamp arrangement portion 14. Accordingly, the vehicle 10 in this example has a substantially symmetrical appearance in the forward and rearward direction.

As illustrated in FIG. 2, operation panels 26 for receiving an instruction from an operator are provided in a passenger compartment front portion of the vehicle 10. Furthermore, a floor panel 100 has a portion near the front end raised to form a seat 28 on which passengers can sit while facing the vehicle rear side. Similarly, as illustrated in FIG. 3, the floor panel 100 has a portion near the rear end raised to form a seat 28 on which passengers can sit while facing the vehicle front side. In the passenger compartment, no large interior part such as a seat is fixedly arranged around the door 22, so that a relatively wide space can be guaranteed.

The vehicle 10 in this example has a body-on-frame structure in which a body 16 having a box shape is mounted on the main frame 12 having a ladder shape. As illustrated in FIGS. 4 and 5, the main frame 12 is roughly divided into a front part Pf located between the pair of front wheels 18, a rear part Pr located between the pair of rear wheels 20, and a center part Pc positioned between the front part Pf and the rear part Pr. The front part Pf is provided with a pair of front side members 30 extending in the vehicle forward and rearward direction, and cross members 36*a*, 36*b*, and 36*c* connecting the pair of front side members 30 to each other. The cross member 36*c* connects the rear ends of the two front side members 30 to each other. Suspension towers 40 for attaching an air suspension (not illustrated) stand from the upper surfaces of the front side members 30.

The rear part Pr is similar to the front part Pf, in that it is also provided with a pair of rear side members 34 extending in the vehicle forward and rearward direction, and cross members 36*i*, 36*j*, and 36*k* connecting the pair of rear side members 34 to each other. The cross member 36*i* connects the front ends of the two rear side members 34 to each other. Suspension towers 40 for attaching an air suspension (not illustrated) stand from the upper surfaces of the rear side members 34.

The center part Pc is provided with a pair of center side members 32 extending in the vehicle forward and rearward direction, and cross members 36*d*, 36*e*, 36*f*, 36*g*, and 36*h* connecting the pair of center side members 32 to each other. The cross member 36*d* connects the front ends of the pair of center side members 32 to each other, and the cross member 36*h* connects the rear ends of the pair of center side members 32 to each other. The cross member 36*e* is provided adjacent to the rear side of the cross member 36*d*, and the cross member 36*g* is provided adjacent to the front side of the cross member 36*h*. In other words, at the front end and the rear end of the center part Pc, two cross members 36 extending in the vehicle width direction are stacked in the forward and rearward direction. Thus, deformation of the center part Pc is more effectively prevented.

As can be clearly seen in FIGS. 4 and 5, the center part Pc is located at a lower level than the front part Pf and the rear part Pr. Therefore, the boundary between the center part Pc and the front part Pf is provided with a kick member 38 that extends vertically and connects the cross member 36*c* and the cross member 36*d* to each other. Similarly, the boundary between the center part Pc and the rear part Pr is provided with a kick member 38 that extends vertically and connects the cross member 36*i* and the cross member 36*h* to each other.

A prime mover, a power transmission device, a brake device, a traveling device, a suspension device, a steering device, an electric device, and the like are assembled to the main frame 12 as described above, whereby a chassis is formed. Here, as described above, a front portion (corresponding to the front part Pf) and a rear portion (corresponding to the rear part Pr) of the floor panel 100 are raised upward. Most of the above-described prime mover and various devices are arranged in a space below the raised portion of the floor panel 100. Hereinafter, the space below the front raised portion of the floor panel 100 (a portion at the lower front corner of the vehicle 10 and between the pair of front wheels 18) will be referred to as a "front side accommodation space 94*f*". Similarly, the space below the rear raised portion of the floor panel 100 (a portion at the lower rear corner of the vehicle 10 and between the pair of rear wheels 20) will be referred to as a "rear side accommodation space 94*r*". The spaces will be simply referred to an "accommodation space 94" with the suffixes f and r omitted, when they are not distinguished from each other as the front side space and the rear side space.

The box-shaped body 16 is assembled on the main frame 12. As illustrated in FIG. 1, the body 16 includes, for example, pillars 42 and 44 extending in the vehicle upward and downward direction, rails 46 extending in the forward and rearward direction at the boundaries between the side surfaces and the top surface of the vehicle 10, and a rocker 48 extending in the forward and rearward direction (hidden by an unlabeled rocker molding 110 in FIG. 1 to be not visible in FIG. 1, see FIG. 16) for supporting, from below, end portions of the floor panel 100 in the vehicle width direction. In the following, a pillar provided at the boundary between the side surface of the vehicle 10 and the front or rear surface is referred to as a "first pillar 42", and a pillar provided in a side surface middle portion of the vehicle 10 and positioned closer to the center in the vehicle forward and rearward direction than is the first pillar 42, is referred to as a "second pillar 44".

<Overall Configuration of Air Conditioner 50>

Figure 6:
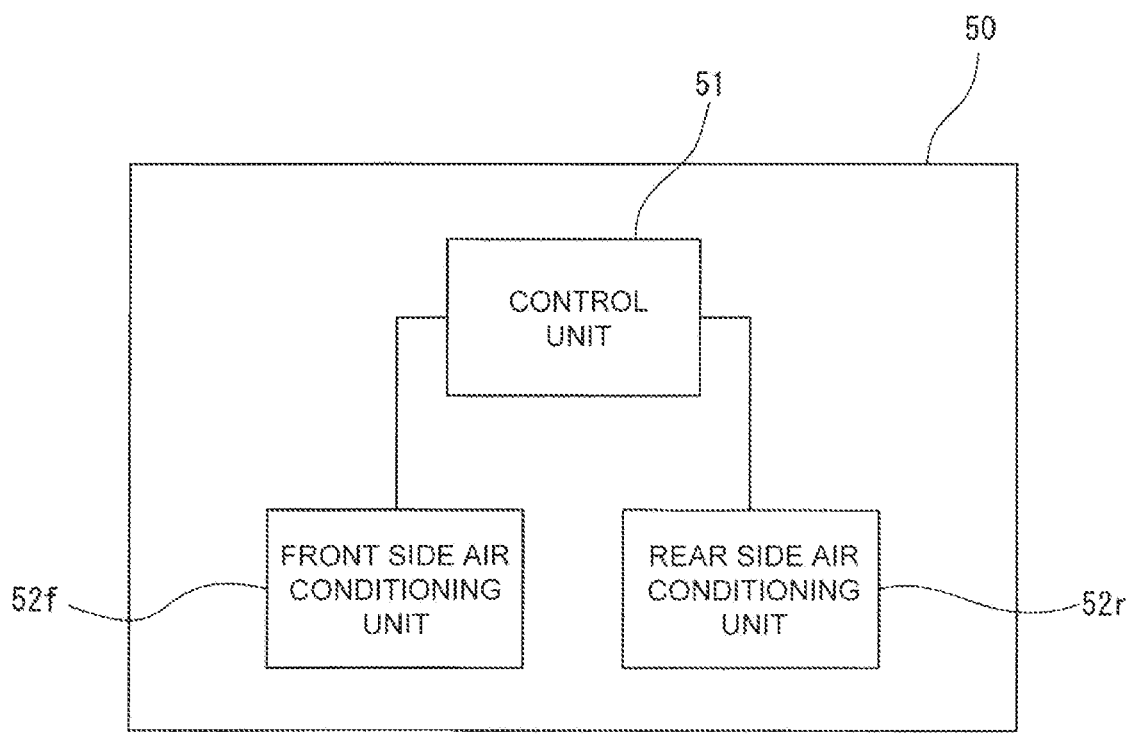
FIG. 6 is a block diagram illustrating a configuration of an air conditioner.

Next, the overall configuration of the air conditioner 50 installed in the vehicle 10 will be described. FIG. 6 is a block diagram illustrating a configuration of the air conditioner 50. As illustrated in FIG. 6, the air conditioner 50 in this example includes a front side air conditioning unit 52*f* for air conditioning in the front part of the passenger compartment, a rear side air conditioning unit 52*r* for air conditioning in the rear part of the passenger compartment, and a control unit 51 that controls the driving of these two units. The two air conditioning units 52*f* and 52*r* have substantially the same configuration. The units will be referred to as "air conditioning unit 52" with the suffixes f and r omitted when they are not distinguished from each other.

The control unit 51 may be, for example, a computer having a processor and a memory, or an electronic control unit (ECU) having a microcomputer, an analog circuit, a power transistor, and the like mounted on a wiring board. The control unit 51 receives a detection result of a sensor mounted on each air conditioning unit, an instruction from an operator input via the operation panels 26, and the like. The control unit 51 calculates a required control amount based on these input signals, and outputs a drive signal to devices forming the air conditioning unit 52 so that the control amount is obtained.

The two air conditioning units 52 can be driven independently of each other. With the two independent air conditioning units 52 thus provided, even if one of the air conditioning units 52 fails, air conditioning can be performed by the other air conditioning unit 52. Thus, the air conditioner 50 can offer improved reliability.

Figure 7:
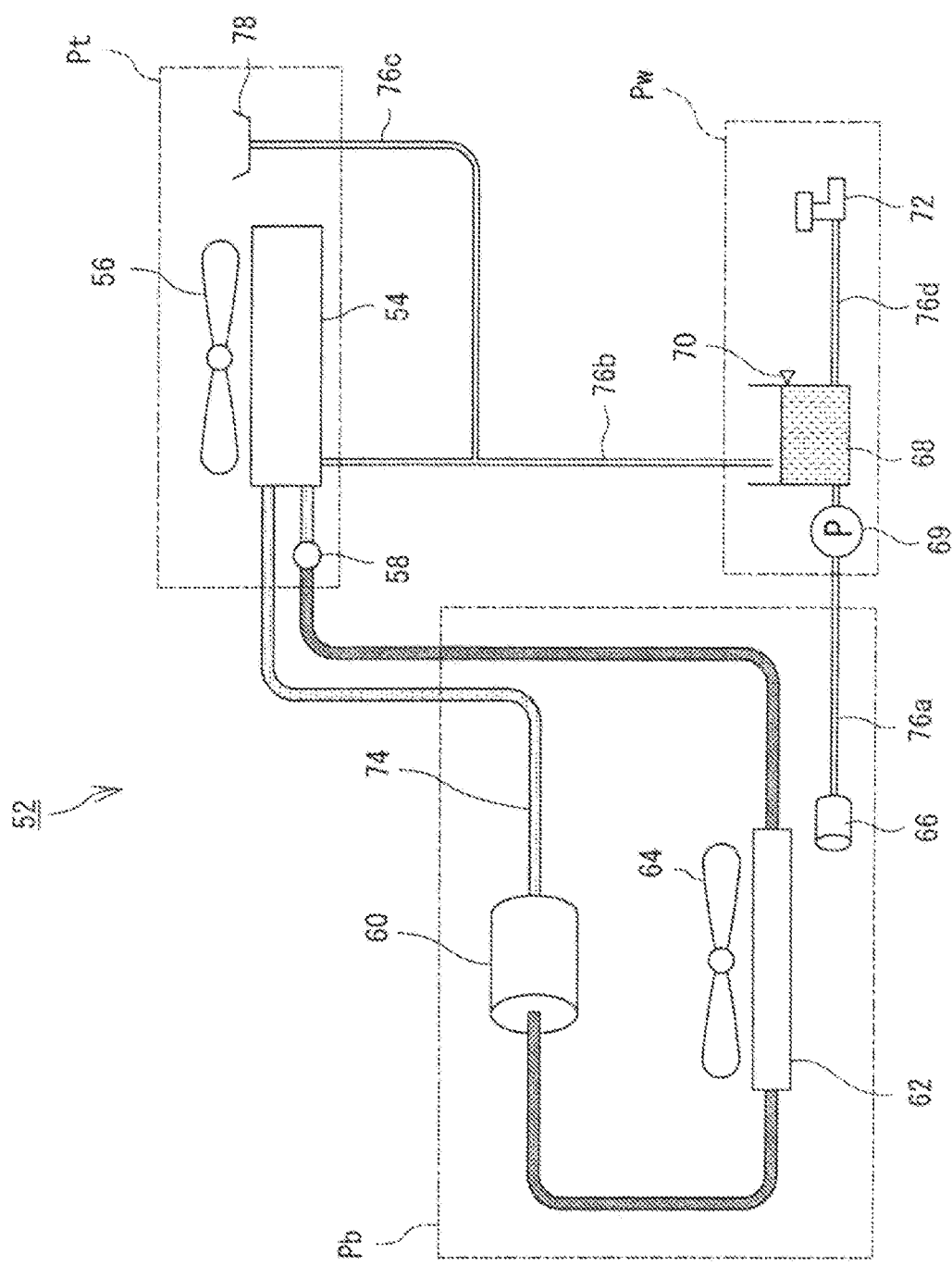
FIG. 7 is a schematic diagram illustrating a configuration of one air conditioning unit.

Next, the configuration of each air conditioning unit 52 will be described. FIG. 7 is a schematic diagram illustrating the configuration of one air conditioning unit 52. The air conditioning unit 52 has a coolant pipe 74 through which a coolant circulates, and a compressor 60, a condenser 62, an expansion valve 58, and an evaporator 54 provided at intermediate sections of the coolant pipe 74. The compressor 60 compresses a gas coolant to obtain a high-temperature and high-pressure liquid coolant. The condenser 62 is a heat exchanger that exchanges heat between the coolant and the outside air. An electric fan 64 that guides the outside air to the condenser 62 is provided behind the condenser 62. Further, the expansion valve 58 rapidly expands the coolant and sends it to the evaporator 54 or the condenser 62. The evaporator 54 is a heat exchanger that exchanges heat with the air in the passenger compartment. A blower fan 56 is provided behind the evaporator 54, and sends the air in the passenger compartment to the evaporator 54 and blows out the air after the heat exchange into the passenger compartment.

In a cooling cycle, a high-temperature and high-pressure semi-liquid coolant is output from the compressor 60 to the condenser 62. The condenser 62 cools the coolant using the outside air to change it into the liquid coolant. The expansion valve 58 injects the liquid coolant sent from the condenser 62 into the evaporator 54 through fine nozzle holes. As a result, the liquid coolant is immediately evaporated. With the coolant thus evaporated, the heat around the evaporator 54 is taken away, whereby the evaporator 54 is cooled. The air from the blower fan 56 passes through the evaporator 54 to be sent into the passenger compartment as cool air. The coolant having flowed out from the evaporator 54 returns to the compressor 60 to be compressed again. In FIG. 7, in the coolant pipe 74, a lightly hatched portion indicates a range where the coolant is in a gas state during cooling, and a darkly hatched portion indicates a range where the coolant is in a liquid or semi-liquid state during cooling. In a heating cycle, the flow of the coolant is opposite to that in the cooling cycle.

Here, this example assumes the vehicle 10 that travels at a low speed, and stops and opens and closes the door 22 frequently, as described above. In such a vehicle, the traveling wind is limited, meaning that the cooling efficiency of the coolant in the compressor 60 is likely to be low. Furthermore, the frequent opening and closing of the door 22 facilitates outflow of the cool air from the passenger compartment, and thus the cooling efficiency is likely to be low. Thus, the vehicle 10 assumed in this example has the problem that a large amount of electric power is required for cooling.

Therefore, in this example, in order to reduce power consumption during cooling, spray nozzles 66 for spraying water in a mist form are provided in front of the compressor 60. The mist water is sprayed on the side of the compressor 60 opposite to the electric fan 64; that is, into an intermediate portion of the flow path of the outside air passing through the compressor 60, that is positioned further on the upstream side than the compressor 60. The sprayed mist water evaporates just before the compressor 60 to take away heat therearound. Thereby, cooler air is blown into the compressor 60 as compared with a case where no spray nozzle 66 is provided. As a result, the coolant can be cooled more efficiently, whereby the cooling efficiency can be improved. As a result, power consumption can be significantly reduced. This can achieve extremely advantageous effects in an electric vehicle using the electric power stored in the main battery 106 as an energy source for traveling. Specifically, a longer continuous traveling time; that is, a longer charging interval, can be achieved.

The air conditioner 50 also includes a water tank 68 for storing water to be supplied to the spray nozzles 66. The water tank 68 and the spray nozzles 66 are connected to each other through an output hose 76a, and a water pump 69 for pumping the stored water to the spray nozzles 66 is provided in an intermediate section of the output hose 76a. Further, a drain hose 76b and a water supply hose 76d are also connected to the water tank 68. The drain hose 76b is a hose that guides condensed water generated by the evaporator 54 to the water tank 68 during cooling. As described above, the frequency of water supply to the water tank 68 can be reduced with the condensed water generated during cooling not discarded but used for the mist spraying. Thus, a workload for managing the air conditioner 50 can be reduced.

A rainwater hose 76c joins with an intermediate section of the drain hose 76b. The rainwater hose 76c is a hose connected to a rainwater collection port 78. The rainwater collection port 78 is provided on the top surface of the vehicle 10, and is an opening through which rainwater is guided to the rainwater hose 76c. In this way, by collecting and storing rainwater in addition to the condensed water, the frequency of supplying water to the water tank 68 can be further reduced, and the workload for managing the air conditioner 50 can be reduced.

The water supply hose 76d is a hose that further connects the water tank 68 and a water supply port 72 to each other. The water supply port 72 is provided at a lower portion of the vehicle 10 and can be connected to an external water hose, as described later in detail. When sufficient water cannot be secured with condensed water and rainwater alone, water is supplied from the water supply port 72 to the water tank 68 through the water supply hose 76d. The water tank 68 is provided with a sensor for detecting the storage amount. Examples of the sensor include a level sensor 70 for detecting the liquid level, a weight sensor for detecting the weight of the stored water, and the like. The control unit 51 outputs an alarm to the operator based on the detection result of the sensor indicating that the storage amount is equal to or less than a certain value. Furthermore, the control unit 51 drives the water pump 69 in conjunction with the driving of the air conditioner 50 to spray mist water to a portion near the compressor 60. Thus, by not only storing condensed water and rainwater, but also supplying water from the outside, it is possible to spray water for a longer period of time, so that an improved cooling efficiency of the air conditioner 50 can be achieved for a longer period of time.

<Overview of Arrangement in Air Conditioner>

Figure 8:
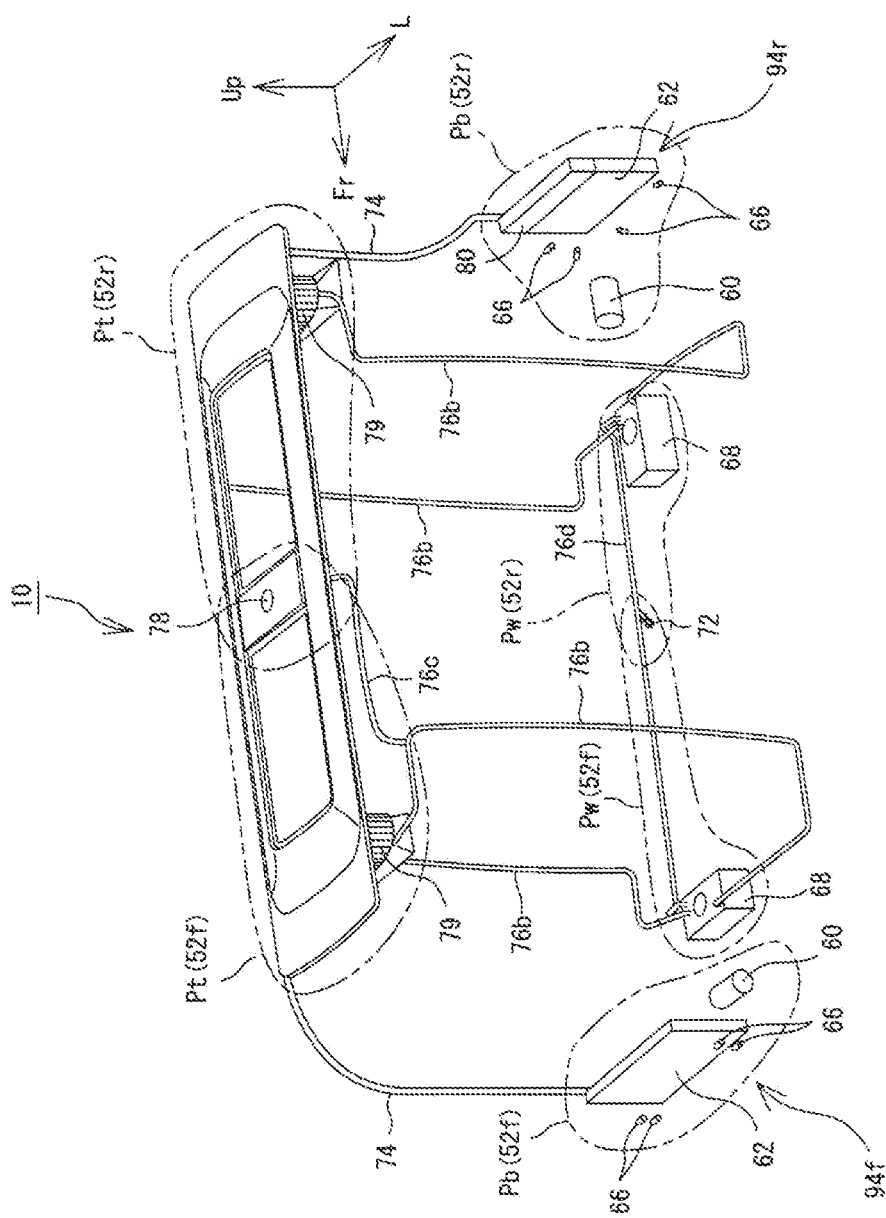
FIG. 8 is a perspective view illustrating an arrangement of main components of the air conditioner.

Next, the arrangement of members forming the air conditioning unit 52 will be described with reference to FIGS. 7 and 8. FIG. 8 is a perspective view illustrating an arrangement of main components of the air conditioner 50. As described above, the air conditioner 50 in this example is roughly divided into the front side air conditioning unit 52f and the rear side air conditioning unit 52r. Each air conditioning unit 52 can be further roughly classified into a ceiling part Pt, a lower part Pb, and a water supply part Pw based on the arrangement.

The ceiling part Pt is arranged on the ceiling portion of the vehicle, and includes the evaporator 54, the blower fan 56, the expansion valve 58, the rainwater collection port 78, and the like. Among them, the evaporator 54, the blower fan 56, and the expansion valve 58 are housed in one case to be a one-piece component. Hereinafter, this one-piece component will be referred to as a "ceiling assembly 79".

The ceiling portion of the vehicle 10 is provided with a ceiling exterior panel 84 and a ceiling interior panel 86 (not illustrated in FIG. 8, see FIG. 9), with a ceiling space 88 provided therebetween. In this example, the ceiling assembly 79 is arranged in the ceiling space 88. As can be clearly seen in FIG. 8, the ceiling assembly 79 of the front side air conditioning unit 52f is arranged near the front end of the ceiling space 88, and the ceiling assembly 79 of the rear side air conditioning unit 52r is arranged near the rear end of the ceiling space 88. The opening functioning as the rainwater collection port 78 is provided substantially at the center of the ceiling portion of the vehicle 10.

The compressor 60, the condenser 62, and the spray nozzles 66 forming the lower part Pb are arranged in the front side accommodation space 94f or the rear side accommodation space 94r. Specifically, in the front side accommodation space 94f, the spray nozzles 66, the condenser 62, and the compressor 60 of the front side air conditioning unit 52f are arranged in this order from the front. In the rear side accommodation space 94r, the compressor 60, the spray nozzles 66, and the condenser 62 of the rear side air conditioning unit 52r are arranged in this order from the front. Note that a radiator 80 used for cooling a motor unit is disposed above the condenser 62 of the rear side air conditioning unit 52r.

The water tank 68 forming the water supply part Pw is arranged under the floor of the vehicle 10. In this example, the water tank 68 of the front side air conditioning unit 52f is provided at a location, under the vehicle floor, adjacent to the front side accommodation space 94f, and the water tank 68 of the rear side air conditioning unit 52r is provided at a location, under the vehicle floor, adjacent to the rear side accommodation space 94r. Furthermore, the water supply port 72 is provided at a lower end of the side surface of the vehicle 10 (below the rocker 48). The water supply port 72 is connected to the two water tanks 68 through the water supply hoses 76d. Therefore, in this example, the front side air conditioning unit 52f and the rear side air conditioning unit 52r share a single water supply port 72.

A portion of the coolant pipe 74 connecting the ceiling assembly 79 and the lower part Pb to each other is provided through the inside of the first pillar 42. Specifically, the first pillar 42 is formed by joining an inner panel and an outer panel (neither of which is illustrated), with a space provided therebetween. In this example, the coolant pipe 74 is provided through this space.

Furthermore, the drain hoses 76b connecting the ceiling assembly 79 and the water tanks 68 to each other are provided through the inside of the second pillars 44. In this example, the drain hoses 76b extend from both ends of the ceiling assembly 79 in the vehicle width direction, and are provided through the second pillars 44 provided on respective sides of the vehicle. As a result, in the vehicle as a whole, four drain hoses 76b are provided through the four second pillars 44.

Specifically, in this example, the vertically extending coolant pipe 74 and the drain hoses 76b are both provided through the pillars 42 and 44. With this configuration, no member dedicated for hiding the coolant pipe 74 and the drain hoses 76b needs to be additionally provided, whereby the configuration of the vehicle can be further simplified. The compressor 60 is disposed in a front or rear portion of the vehicle 10. The water tank 68 is disposed closer to the center in the vehicle forward and rearward direction than is the compressor 60. With the coolant pipe 74 connected to the compressor 60 provided through the first pillar 42 and the drain hose 76b connected to the compressor 60 provided through the second pillar 44 located closer to the center than is the first pillar 42, the lengths of the coolant pipe 74 and the drain hoses 76b can be reduced. As a result, the material cost can be reduced. The reduced length of the coolant pipe 74 further results in a smaller heat loss of the coolant, whereby the air conditioning efficiency can be further improved.

The rainwater hose 76c joins the drain hose 76b near the ceiling of the vehicle 10. The water supply hose 76d connected to the water supply port 72 extends in the forward and rearward direction on the side of the rocker 48, and is connected to the two water tanks 68.

<Ceiling Assembly>

Figure 9:
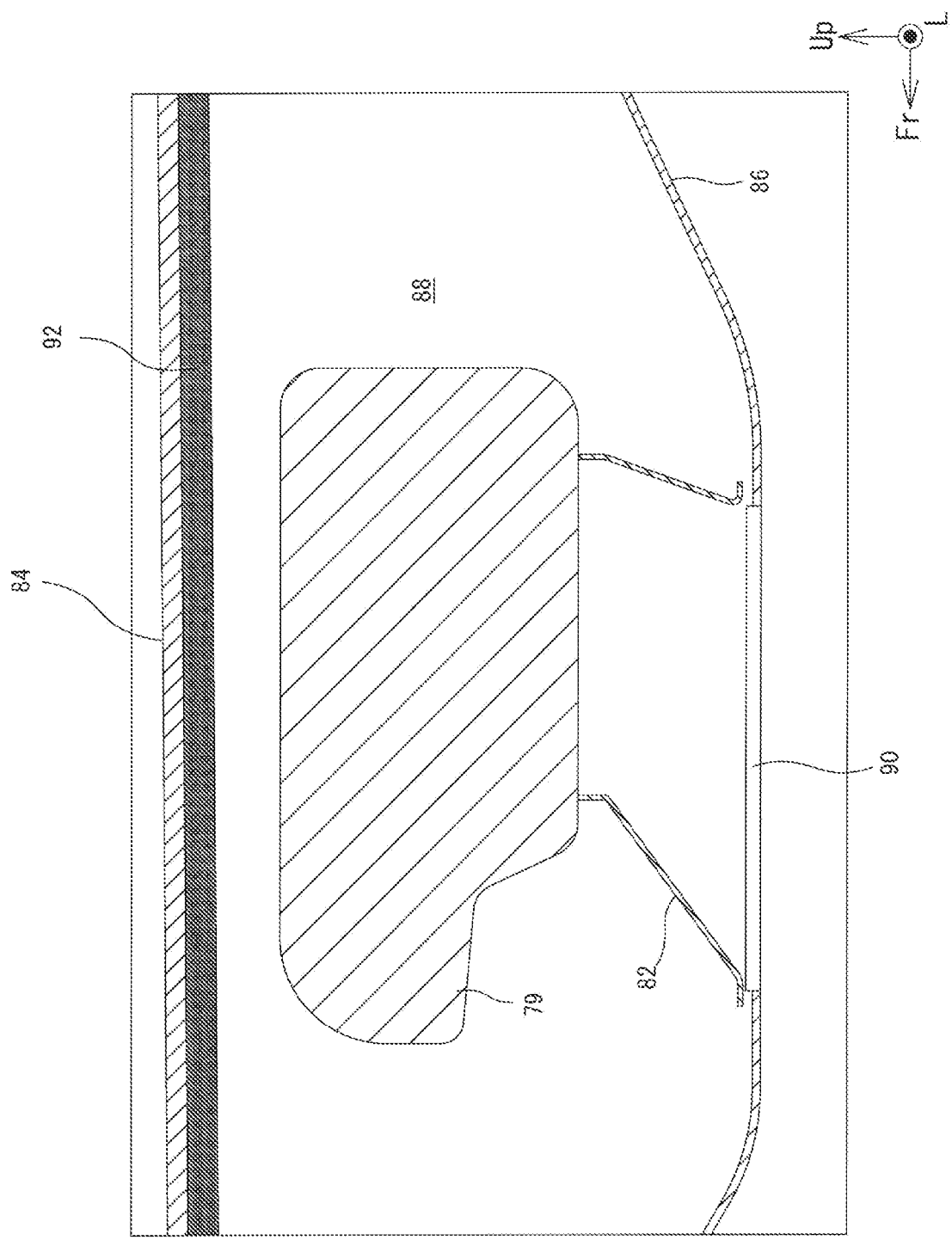
FIG. 9 is a schematic cross-sectional view of a section around a ceiling assembly.

Next, the configuration of the ceiling assembly 79 will be described. FIG. 9 is a schematic cross-sectional view of a section around the ceiling assembly 79. The ceiling assembly 79 is disposed in the ceiling space 88 formed between the ceiling exterior panel 84 and the ceiling interior panel 86, as described above. A ventilation port 90, communicating with the passenger compartment and the ceiling space 88, is formed in a portion of the ceiling interior panel 86 facing the ceiling assembly 79. Further, a duct 82 that guides the air flow is disposed between the ventilation port 90 and the ceiling assembly 79. The air in the passenger compartment is guided to the ceiling assembly 79 via the ventilation port 90 and the duct 82, and the temperature-conditioned air output from the ceiling assembly 79 is discharged into the passenger compartment. Therefore, the conditioned air is blown out from the top surface of the passenger compartment.

Here, some conventionally known vehicles have a top surface of the passenger compartment provided with an air-conditioner outlet. However, in such conventional vehicles, a compressor and a condenser are provided in the ceiling space of the vehicle in addition to the evaporator, the blower fan, and the expansion valve. Thus, the ceiling space needs to have a large thickness to accommodate all these components. The thickness of the ceiling space may be increased with the ceiling exterior panel protruding outward (upward) in a portion where the air conditioning unit is arranged. However, this results in a reduced degree of freedom of vehicle design, and an increased vehicle height. Alternatively, instead of the ceiling exterior panel, the ceiling interior panel can protrude inward (downward) so that the thickness of the ceiling space can be secured while suppressing the increase in the vehicle height. However, this results in a low ceiling of the passenger compartment, which directly leads to a vehicle passenger compartment with the sense of openness compromised.

In this example, only the ceiling assembly 79 (the evaporator 54, the blower fan 56, and the expansion valve 58) is arranged in the ceiling space 88, whereby the thickness of the ceiling space 88 can be prevented from being large. As a result, the passenger compartment can have a high ceiling without increasing the vehicle height. Furthermore, the ceiling space 88 can be thin, whereby a degree of freedom of the vehicle design can be improved.

Here, as described above, in this example, at least one peripheral information sensor 130 is mounted on the outer surface of the ceiling of the vehicle 10. The peripheral information sensor 130 transmits and receives light or radio waves to detect the peripheral information. Therefore, if there is a protruding portion that blocks light or radio waves near the peripheral information sensor 130, the peripheral information cannot be sufficiently detected. Therefore, a protrusion or the like on the outer surface of the ceiling of the vehicle 10 will limit the installation position of the peripheral information sensor 130. In this example, as described above, only the ceiling assembly 79 is disposed on the ceiling, and thus there is no large protrusion on the outer surface of the ceiling of the vehicle 10. As a result, the degree of freedom of the installation position of the peripheral information sensor 130 is improved.

The ceiling of the vehicle 10 is likely to be exposed to direct sunlight, and the temperature of the ceiling space 88 is likely to rise in summer. Thus, when the evaporator 54 and the like are arranged in the ceiling space 88, the cooling efficiency may be compromised. Therefore, in this example, a heat insulating sheet 92 is attached to the back surface of the ceiling exterior panel 84 (the surface facing the ceiling interior panel 86). The material of the heat insulating sheet 92 is not particularly limited so long as it has appropriate heat insulating properties. Thus, the heat insulating sheet 92 may be formed of, for example, a fiber heat insulating material such as glass wool or rock wool, or may be formed of a foam heat insulating material such as urethane foam or phenolic foam. In any case, with the heat insulating sheet 92 attached to the back surface of the ceiling exterior panel 84, the rise in the temperature of the ceiling space 88 can be suppressed, whereby the cooling efficiency of the air conditioner 50 can be improved.

<Lower Part of Front Side Air Conditioning Unit>

Figure 10:
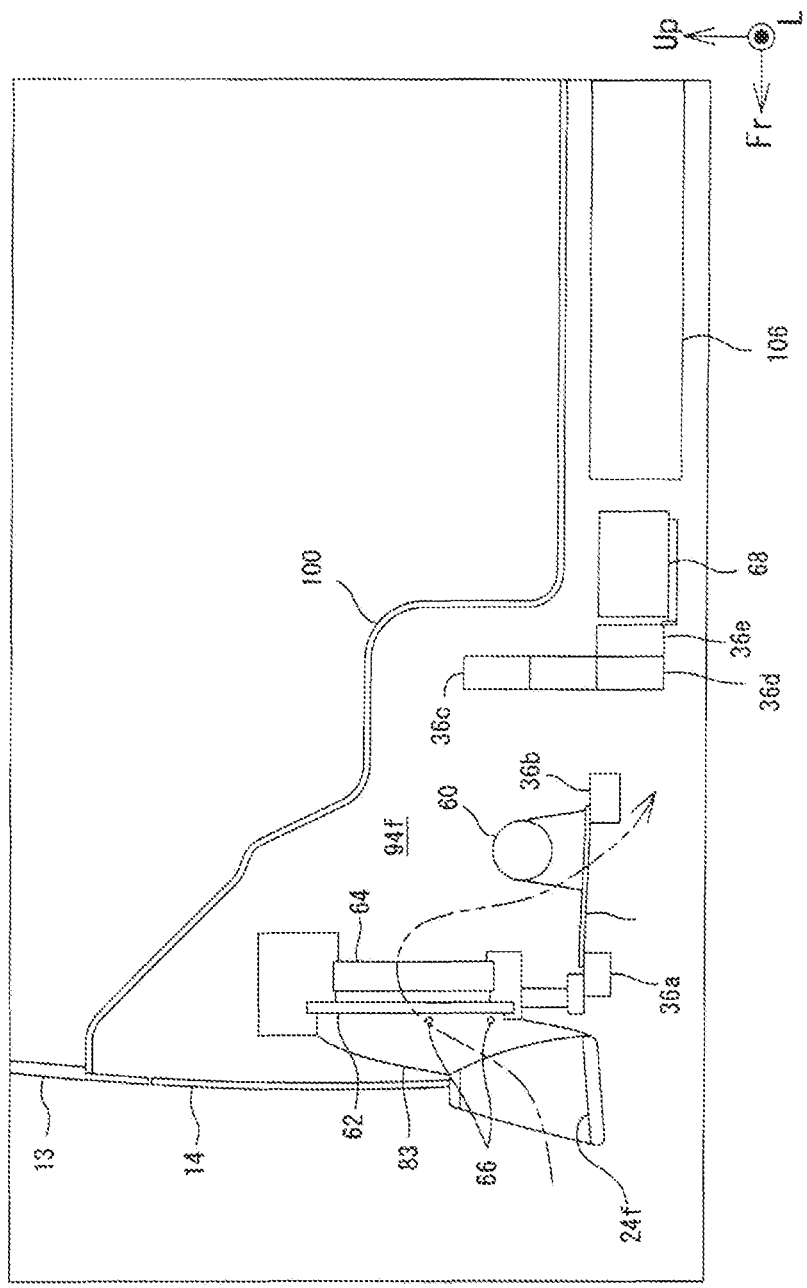
FIG. 10 is a schematic diagram illustrating an arrangement of a lower part accommodated in a front side accommodation space.
Figure 11:
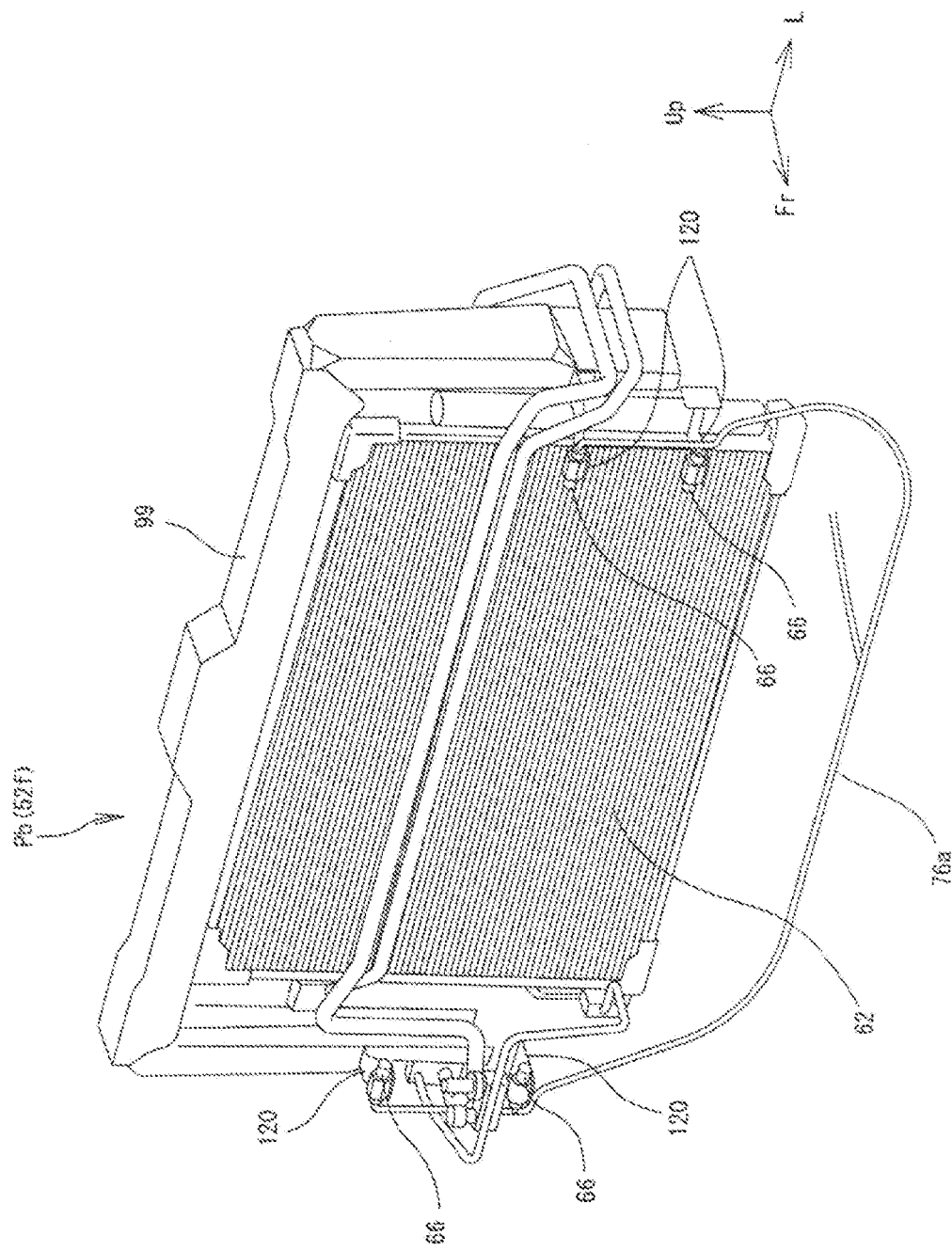
FIG. 11 is a perspective view illustrating a section around a condenser of a front side air conditioning unit.
Figure 12:
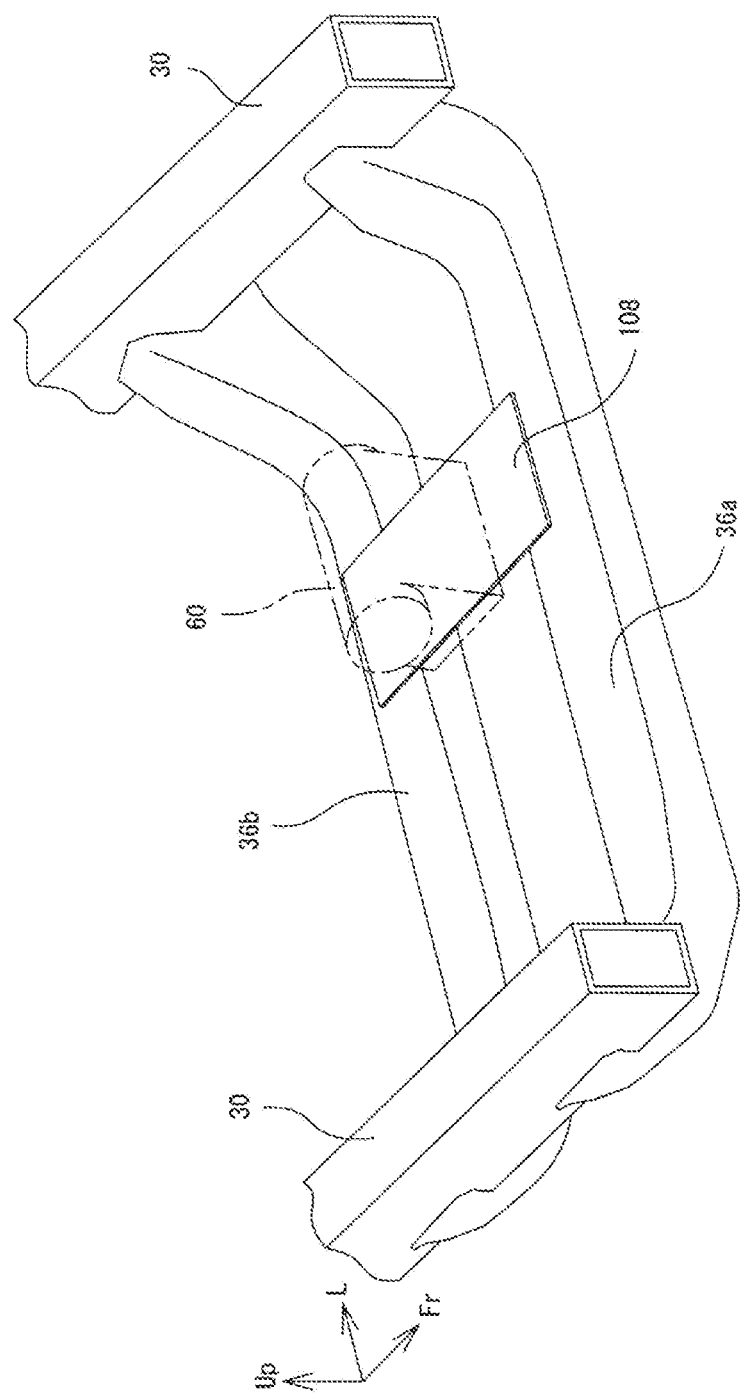
FIG. 12 is a schematic perspective view illustrating an arrangement of a compressor of the front side air conditioning unit.

Next, the lower part Pb of the front side air conditioning unit 52f will be described. FIG. 10 is a schematic diagram illustrating an arrangement of the lower part Pb accommodated in the front side accommodation space 94f. FIG. 11 is a perspective view illustrating a section around the condenser 62 of the front side air conditioning unit 52f. FIG. 12 is a schematic perspective view illustrating an arrangement of the compressor 60 of the front side air conditioning unit 52f.

As illustrated in FIG. 10, the spray nozzles 66, the condenser 62, the electric fan 64, and the compressor 60 are arranged in the front side accommodation space 94f in this order from the front. Further, the front grill 24f through which the front side accommodation space 94f is communicated with the outside is disposed in front of the condenser 62. The front grill 24f is provided at the lower end of the front end surface of the vehicle 10.

The front grill 24f is arranged at the lower end of the front end surface, so that a large area can be secured for the lamp arrangement portion 14. As illustrated in FIG. 10, the front grill 24f arranged at the lower end of the front end surface has its upper end located below the center of the condenser 62 in the height direction. Thus, the front grill 24f is offset downward with respect to the condenser 62. Therefore, as indicated by a two-dot chain line in FIG. 10, outside air enters the front side accommodation space 94f from the front grill 24f, and is then sucked by the electric fan 64 to flow upward. Then, after passing through the condenser 62 and the electric fan 64, the outside air flows downward and then flows from the bottom of the front side accommodation space 94f to the outside.

Thus, in this example, the outside air flowing into the condenser 62 flows along a mountain-like route with the top being positioned around the condenser 62. A duct 83 is provided between the front grill 24f and the condenser 62 to guide the flow of the outside air. The front side accommodation space 94f not only includes the components forming the air conditioning unit 52 but also includes a brake device, a steering device, a pump of an air suspension, an air tank, and the like. The outside air that has passed through the condenser 62 and the electric fan 64 is discharged to the outside through gaps between the brake device, the steering device, and the like.

As illustrated in FIG. 11, the condenser 62 of the front side air conditioning unit 52f has a flat rectangular parallelepiped shape, and has a horizontally long rectangular shape in front view. The condenser 62 is supported by a support frame 99. The support frame 99 has a rear portion connected to a fan shroud (not illustrated) that supports the electric fan 64. As a result, the electric fan 64 is located immediately behind the condenser 62.

A plurality of the spray nozzles 66 are arranged in front of the condenser 62. In this example, four spray nozzles 66 are provided, with two nozzles provided near each of both ends of the condenser 62 in the vehicle width direction. Furthermore, the spray nozzles 66 are oriented with the spray axis direction being in parallel with the surface of the condenser 62. Specifically, the spray nozzles 66 are arranged to have the spray axis oriented in parallel with the vehicle width direction. With such a configuration, the mist is less likely to hit the condenser 62, and is likely to spread in the space in front of the condenser 62. As a result, the mist can be sprayed more evenly. Each spray nozzle 66 is supported by a nozzle bracket 120, and the nozzle bracket 120 is attached to the support frame 99. The mist sprayed from the spray nozzles 66 is vaporized at a position immediately before the condenser 62, and thus the outside air temperature flowing into the condenser 62 can be reduced. Thus, the cooling efficiency of the coolant in the condenser 62, and thus the cooling efficiency of the air conditioner 50 can be improved.

As can be clearly seen in FIG. 10, each of the spray nozzles 66 is disposed above the water tank 68. With this configuration, water is not output from the spray nozzles 66 unless pressure is applied from the water pump 69. As a result, there is no need to provide a valve or the like for preventing leakage of water at an intermediate section of the output hose 76a, whereby the configuration can be simplified.

The compressor 60 of the front side air conditioning unit 52f is disposed behind the electric fan 64. To thus arrange the compressor 60, in this example, a support plate 108 is bridged between the pair of cross members 36a and 36b (see FIGS. 5 and 12) provided in the front part Pf. The support plate 108 is a substantially flat plate made of metal, and has one end welded to the cross member 36a and the other end welded to the cross member 36b. The compressor 60 is fixed on the support plate 108.

As can be clearly see in FIG. 12, both cross members 36a and 36b have shapes with both ends in the vehicle width direction raised toward the front side member 30. Therefore, the middle portions of the cross members 36a and 36b in the vehicle width direction are located at a lower level than the front side members 30. Thus, the compressor 60 can be arranged at a low height, whereby the space efficiency of the front side accommodation space 94f can be improved.

Again, as described above, in the front side air conditioning unit 52f, the condenser 62, the compressor 60, and the spray nozzles 66 are arranged in the front side accommodation space 94f. This arrangement is for downsizing the ceiling assembly 79 to increase the degree of freedom of design around the ceiling of the vehicle 10 as described above. In addition, the compressor 60, which is a relatively heavy component in the front side air conditioning unit 52f, is arranged in a lower portion of the vehicle 10, whereby the stability of the vehicle 10 can be improved. Furthermore, the condenser 62 arranged behind the front grill 24f is more likely to receive the traveling wind, as compared with a case where the condenser 62 is arranged on the ceiling, whereby the cooling efficiency can be improved.

In this example, the front grill 24f is arranged to be offset downward with respect to the condenser 62 so that the degree of freedom in design of the front of the vehicle 10 can be increased. The duct 83 is provided behind the front grill 24f in this example so that the traveling wind can smoothly reach the condenser 62 in such a configuration. In addition, the rotation speed of the electric fan 64 is controlled so that a sufficient amount of outside air flows to the condenser 62.

<Lower Part of Rear Side Air Conditioning Unit>

Figure 13:
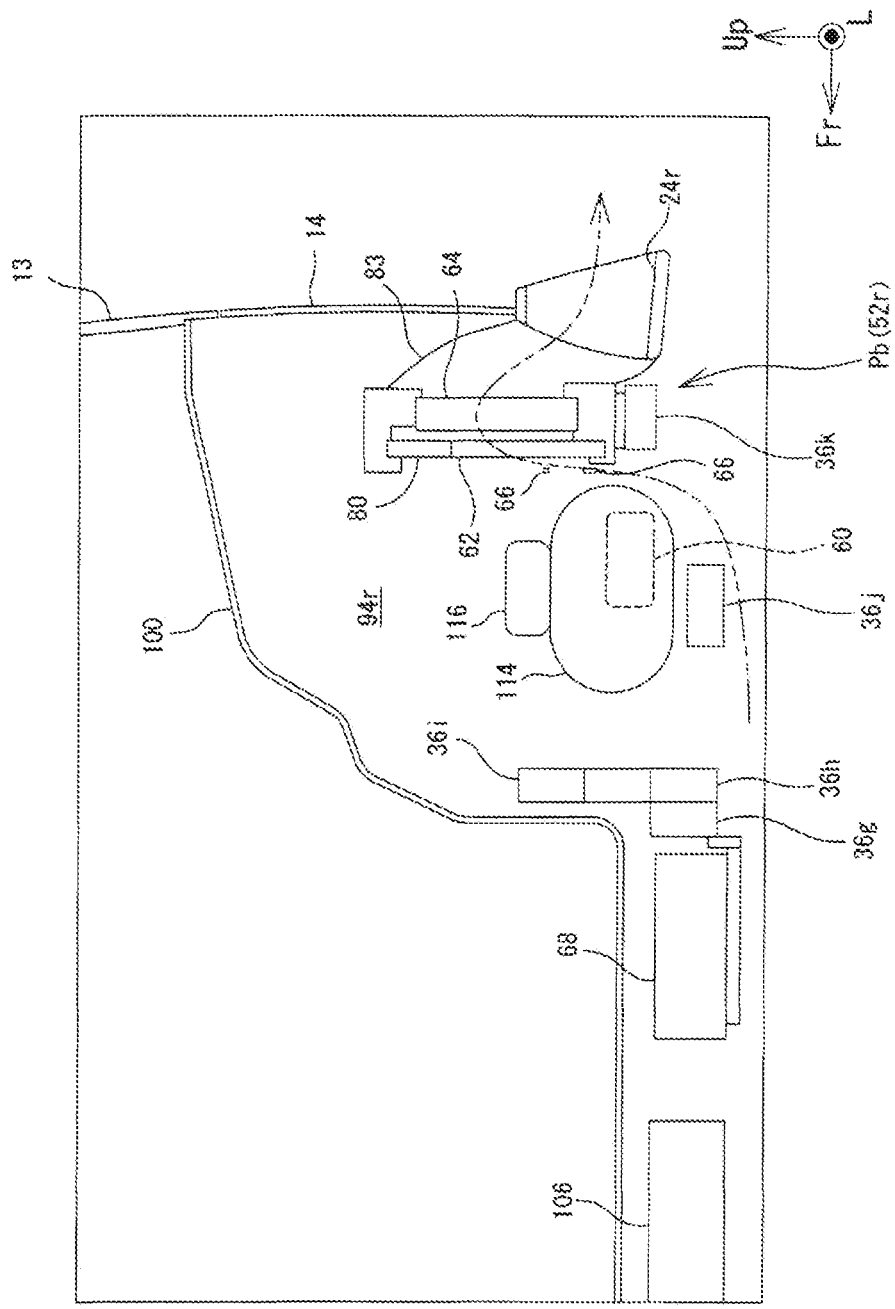
FIG. 13 is a schematic diagram illustrating an arrangement of a lower part accommodated in a rear side air conditioning unit.
Figure 14:
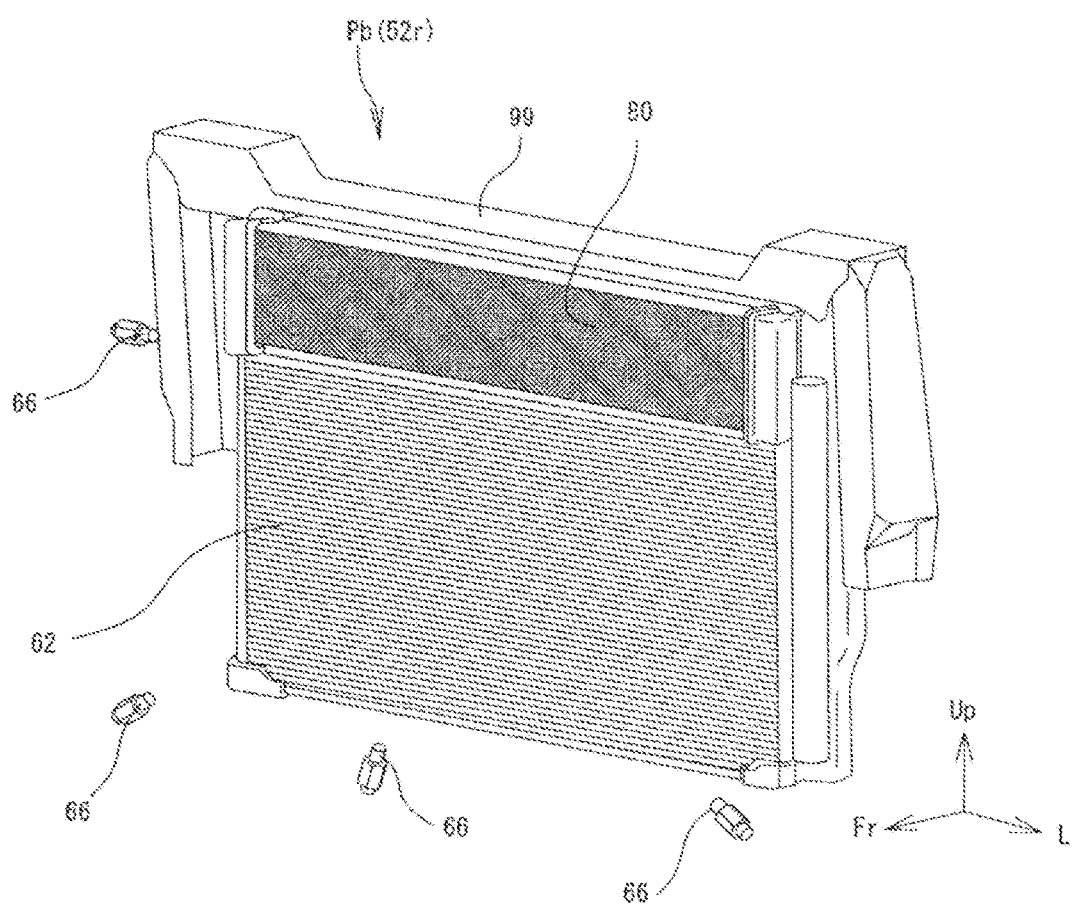
FIG. 14 is a perspective view illustrating a section around a condenser of the rear side air conditioning unit.

Next, the lower part Pb of the rear side air conditioning unit 52r will be described. FIG. 13 is a schematic diagram illustrating an arrangement of the lower part Pb accommodated in the rear side air conditioning unit 52r. FIG. 14 is a perspective view illustrating a section around the condenser 62 of the rear side air conditioning unit 52r. As illustrated in FIG. 13, the compressor 60, the spray nozzles 66, the condenser 62, and the electric fan 64 are arranged in the rear side accommodation space 94r in this order from the front. In addition, the rear grill 24r through which the rear side accommodation space 94r is communicated with the outside is disposed behind the electric fan 64. The rear grill 24r is provided at the lower end of the rear end surface of the vehicle 10, as in the case of the front grill 24f. As a result, a large area can be secured for the lamp arrangement portion 14 on the rear side.

Therefore, also in the rear side air conditioning unit 52r, the upper end of the rear grill 24r is located below the center of the condenser 62 in the height direction, and the rear grill 24r is offset downward with respect to the condenser 62. Therefore, as indicated by a two-dot chain line in FIG. 13, outside air enters the rear side accommodation space 94r from the lower side in the rear side accommodation space 94r, and is then sucked by the electric fan 64 to flow upward. Then, after passing through the condenser 62 and the electric fan 64, the outside air flows downward and then flows to the outside through the rear grill 24r. Thus, also in this example, the outside air flows along a mountain-like route with the top being positioned around the condenser 62. To prevent the backflow of the outside air (exhaust air) output from the electric fan 64, the duct 83 is provided between the electric fan 64 and the rear grill 24r to guide the flow of the exhaust air in this example.

The rear side accommodation space 94r includes, in addition to the components of the air conditioning unit 52, a power unit 114 as a combination of a drive motor and a transmission mechanism, a power control unit (PCU) 116 for controlling the drive of the power unit 114, and the like. The condenser 62 is attached to a side portion of a case of the power unit 114.

As illustrated in FIG. 14, the condenser 62 of the rear side air conditioning unit 52r has a flat rectangular parallelepiped shape, and has a horizontally long rectangular shape in front view. The radiator 80 having a flat rectangular parallelepiped shape is disposed above the condenser 62 of the rear side air conditioning unit 52r. The radiator 80 is for cooling a coolant for cooling the power unit 114. The support frame 99 holds the radiator 80 and the condenser 62 that are vertically arranged. The support frame 99 has a rear portion connected to a fan shroud (not illustrated) that supports the electric fan 64, and the electric fan 64 is located immediately behind the condenser 62 and the radiator 80.

A plurality (four in the illustrated example) of the spray nozzles 66 are arranged in front of the condenser 62. The plurality of spray nozzles 66 are each oriented with the spray axis direction being in parallel with the surface of the condenser 62. In the rear side air conditioning unit 52r, the plurality of spray nozzles 66 are more randomly arranged than in the front side air conditioning unit 52f. Such an arrangement is for avoiding interference between the spray nozzles 66 and various members arranged around the condenser 62 of the rear side air conditioning unit 52r. In other words, in addition to the pipe through which the coolant and water used for air conditioning flow, the pipe through which the coolant for cooling the power unit 114 flows is also provided around the condenser 62 of the rear side air conditioning unit 52r. Thus, the space available around the condenser 62 is limited as compared with the space available in the front side air conditioning unit 52f. Consequently, in the rear side air conditioning unit 52r, the plurality of spray nozzles 66 are more randomly arranged than in the front side air conditioning unit 52f.

As described above, also in the rear side air conditioning unit 52r, the compressor 60 and the spray nozzles 66 are arranged in the lower portion of the vehicle 10, so that the degree of design freedom around the ceiling of the vehicle 10 is increased, and the stability of the vehicle 10 can be improved, as in the case of the front side air conditioning unit 52f.

Incidentally, as is clear from the above description, in this example, the two lower parts Pb each including the condenser 62 and the spray nozzles 66 are prepared, and these two lower parts Pb are respectively arranged in the front and rear portions of the vehicle 10. With this configuration, the condensers 62 can be arranged in a well-balanced manner without having a large size. Specifically, in some embodiments, the condensers 62 have an increased surface area to increase the heat exchange efficiency thereof. However, a large accommodation space 94 is difficult to secure in the vehicle 10. This is particularly the case with the vehicle 10 having a box shape with no hood or trunk as in this example. Thus, it is difficult to install a condenser 62 with a large surface area. In this example, the two condensers 62 that can be accommodated in the accommodation space 94 are prepared and are respectively arranged in the front and the rear portions. Thus, a sufficient cooling performance can be achieved with the condensers 62 each having a limited size.

<Water Supply Part>

Figure 15:
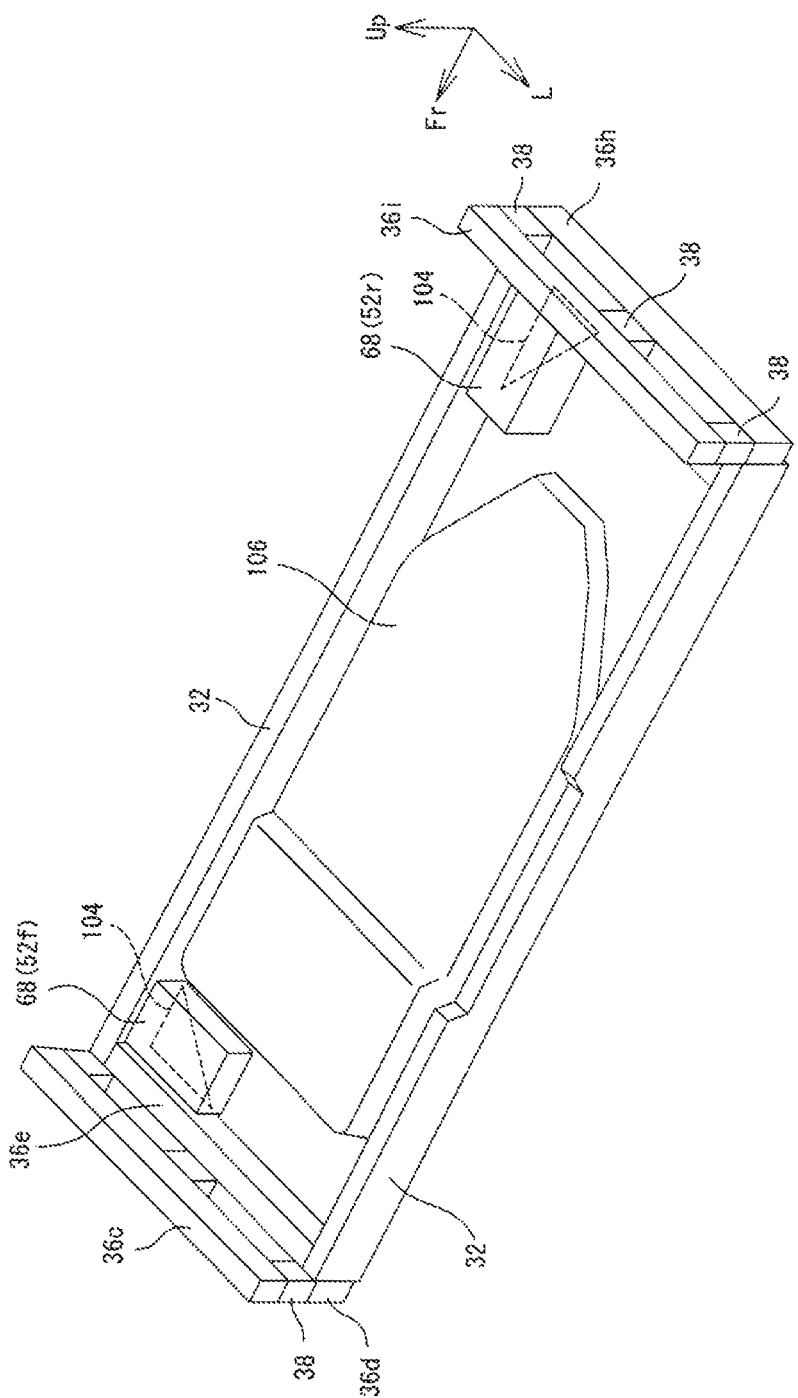
FIG. 15 is a schematic perspective view illustrating a section around a center part.

Next, the configuration of the water supply part Pw will be described. FIG. 15 is a schematic perspective view illustrating a section around the center part Pc. The water supply part Pw has the water tank 68 for storing mist water. This water tank 68 is arranged under the floor of the passenger compartment. More specifically, the water tank 68 of the front side air conditioning unit 52f is arranged in a corner portion where the center side member 32 and the cross member 36e intersect. In the corner portion, a triangular bracket 104 having the substantial shape of a triangle is provided with one side thereof welded to the bottom surface of the center side member 32 and another side thereof welded to the bottom surface of the cross member 36e. The water tank 68 of the front side air conditioning unit 52f is placed and fixed on the triangular bracket 104. Similarly, the water tank 68 of the rear side air conditioning unit 52r is arranged in a corner portion where the center side member 32 and the cross member 36g intersect. A triangular bracket 104 is also provided in this corner portion, and the water tank 68 is placed and fixed on the triangular bracket 104.

The main battery 106 that supplies power to the power unit 114 is also arranged under the floor of the vehicle. The main battery 106 has a flat shape that is long in the vehicle forward and rearward direction. The thickness (height dimension) of the main battery 106 is substantially the same as the height dimension of the center side member 32. The main battery 106 is arranged to be separated from the cross member 36e and the cross member 36g with an appropriate gap therebetween. The water tank 68 is disposed in the gap between the main battery 106 and the cross members 36e and 36g. That is, in this example, the water tank 68 is arranged using a dead space generated in front of and behind the main battery 106. In order to enable such an arrangement, the thickness (height dimension) of the water tank 68 is set to be substantially the same as the thickness (height dimension) of the main battery 106.

As can be clearly seen in FIG. 15, the two water tanks 68 are both arranged on one side in the vehicle width direction (the right side in this example). In this example, the water supply port 72 is also arranged on one side in the vehicle width direction (the right side in this example), as in the case of the two water tanks 68. With this configuration, the path of the water supply hose 76d communicating the one water supply port 72 with the two water tanks 68 can be made substantially linear (see FIG. 8), so that the water supply hose 76d can be routed simply. Furthermore, in this example, the two water tanks 68 are provided on the right side to be on the side opposite to the door 22 of the vehicle 10 provided on the left side. In other words, with the relatively heavy water tanks 68 arranged on the side opposite to the door 22, it is possible to effectively reduce the shaking of the vehicle caused by the passengers getting on and off. Furthermore, arranging the heavy water tanks 68 under the floor lowers the center of gravity of the vehicle 10, resulting in further improved stability of the vehicle 10. With the water supply port 72 further disposed on the side opposite to the door 22, the feet of the passengers getting on and off and the like can be more effectively prevented from coming into contact with the water supply port 72.

Figure 16:
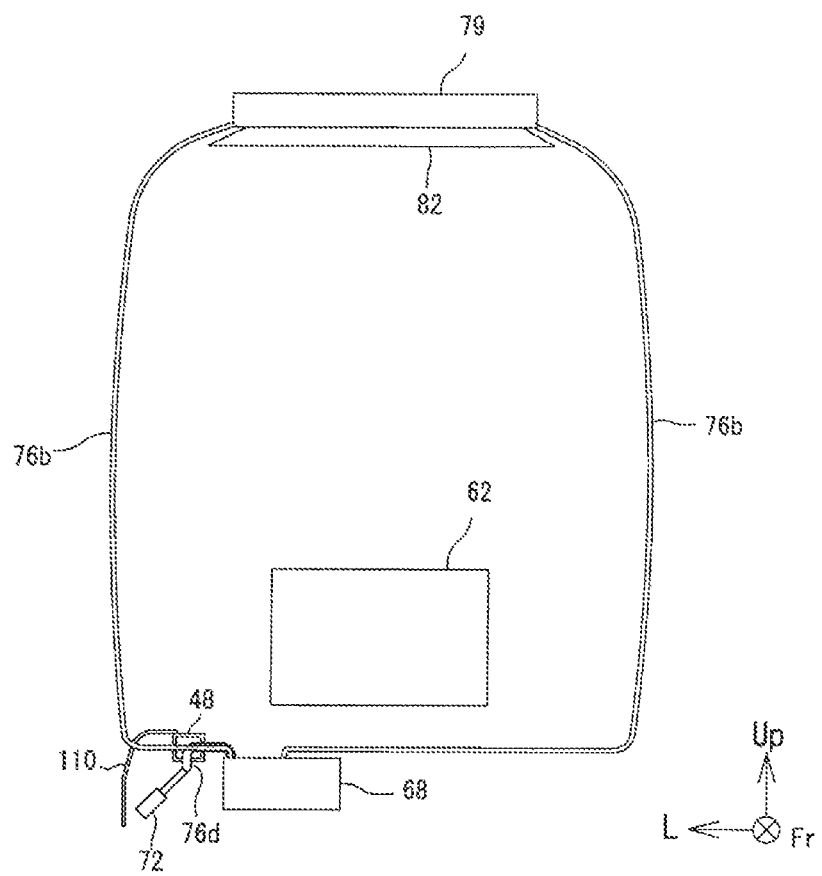
FIG. 16 is a schematic view illustrating a periphery of a water supply port as viewed from the front.

Next, an arrangement of the water supply port 72 will be described with reference to FIG. 16. FIG. 16 is a schematic view illustrating a periphery of the water supply port 72 as viewed from the front. The rocker 48 is provided at the lower end of the side surface of the vehicle 10 and extends in the vehicle forward and rearward direction to support both ends of the floor panel 100 in the vehicle width direction from below. The water supply hose 76d connecting the water supply port 72 and the water tank 68 to each other passes through a space immediately outside the rocker 48. The water supply port 72 is formed of, for example, a substantially cylindrical fluid coupling, and is arranged so as to protrude obliquely downward from the rocker 48.

The rocker molding 110, which is a resin member for hiding the rocker 48 for the sake of improved appearance, is provided further on the outer side than the rocker 48 in the vehicle width direction. As illustrated in FIG. 16, the rocker molding 110 is a panel member having a substantially L-shaped cross section that extends outward in the horizontal direction and then downward. The water supply port 72 has a lower end positioned at the same level as or slightly higher than the lower end of the rocker molding 110. Thus, the water supply port 72 is hidden behind the rocker molding 110 so as not to be viewable from the outer side of the vehicle 10. On the other hand, a space large enough to enable an external water hose to pass therethrough is provided below the rocker molding 110. Thus, this water hose can be smoothly connected to the water supply port 72.

<Other Configurations>

As is clear from the above description, in the air conditioner 50 disclosed in this specification, water is sprayed to a section immediately before the compressor 60, so that the cooling efficiency can be further improved. With the spray nozzle 66 provided at a higher level than the water tank 68, it is possible to effectively prevent the water in the water tank 68 from leaking from the spray nozzle 66 due to gravity, without providing a valve on the upstream side of the spray nozzle 66. Thus, the water is less likely run short, and thus the water can be sprayed when necessary. As a result, sufficient cooling efficiency can be reliably maintained with a configuration with no valve. It should be noted that the configuration described so far is merely an example. So long as the spray nozzle 66 is provided at a higher level than the water tank 68, other configurations can be modified as appropriate. Furthermore, so long as the spray nozzle 66 is provided at a higher level than the water tank 68, arrangement of other components can be modified as appropriate. For example, the compressor 60 may be arranged in the ceiling space 88 instead of the accommodation space 94 in the lower portion of the vehicle. Similarly, the expansion valve 58 may be provided in the accommodation space 94 or the first pillar 42 instead of in the ceiling space 88. Furthermore, the air conditioning units 52 do not need to be provided on the upper and lower sides respectively, and the evaporator 54 and the blower fan 56 may be arranged in the accommodation space 94 in the lower portion of the vehicle.

REFERENCE SIGNS LIST

10 Vehicle
12 Main frame
13 Window
14 Lamp arrangement portion
15 Signal lamp
16 Body
18 Front wheel
20 Rear wheel
22 Door
24f Front grill
24r Rear grill
26 Operation panel
28 Seat
30 Front side member
32 Center side member
34 Rear side member
36a to 36k Cross member
38 Kick member
40 Suspension tower
42 First pillar
44 Second pillar 46 Rail
48 Rocker
50 Air conditioner
51 Control unit
52f Front side air conditioning unit
52r Rear side air conditioning unit
54 Evaporator
56 Blower fan
58 Expansion valve
60 Compressor
62 Condenser
64 Electric fan
66 Spray nozzle
68 Water tank
69 Water pump
70 Level sensor
72 Water supply port
74 Coolant pipe
76a Output hose
76b Drain hose
76c Rainwater hose
76d Water supply hose
78 Rainwater collection port
79 Ceiling assembly
80 Radiator
82, 83 Duct
84 Ceiling exterior panel
85 Ceiling interior panel
86 Ceiling space
88 Ventilation port
90 Heat insulating sheet
94f Front side accommodation space
94r Rear side accommodation space
99 Support frame
100 Floor panel
104 Triangular bracket
106 Main battery
108 Support plate
110 Rocker molding
112 Motor unit
114 Power unit
116 Power control unit (PCU)
120 Nozzle bracket
Pb Lower part
Pc Center part
Pf Front part
Pr Rear part
Pt Ceiling part
Pw Water supply part

The invention claimed is:

1. A vehicle air conditioner installed in a vehicle, the vehicle air conditioner comprising:
a front side air conditioning unit for air conditioning on a front side of a passenger compartment, the front side air conditioning unit comprising:
a condenser that causes heat exchange between a coolant and outside air;
a supporting frame that surrounds an edge of the condenser to support the condenser;
a plurality of spray nozzles that sprays water to the outside air flowing to the condenser, the plurality of spray nozzles provided in a front accommodation space in a lower front portion of the vehicle and mounted on opposite sides of the supporting frame in a vehicle width direction;
a compressor provided on a side of the condenser opposite the plurality of spray nozzles; and
a water tank that is provided under a floor of the vehicle, is in communication with the spray nozzle through an output hose, and stores the water to be sprayed, wherein the at least one spray nozzle is disposed at a higher level than the water tank; and
a rear side air conditioning unit for air conditioning on a rear side of the passenger compartment, the rear side air conditioning unit comprising:
a second condenser;
a second plurality of spray nozzles that are provided in a rear side accommodation space in a lower rear portion of the vehicle;
a second compressor provided on a same side of the second condenser as the second plurality of spray nozzles; and
a second water tank provided under the floor of the vehicle.

2. The vehicle air conditioner according to claim 1, wherein
each spray nozzle of the plurality of spray nozzles is disposed at a position further on a front side than the condenser, while being oriented to have a spraying axis extending in parallel with a front surface of the condenser.

3. The vehicle air conditioner according to claim 1, wherein the plurality of spray nozzles are provided on a vehicle front side of the condenser, and wherein the second plurality of spray nozzles are provided on a vehicle front side of the second condenser.

4. The vehicle air conditioner according to claim 3, wherein the front side air conditioning unit includes a first electric fan provided on a vehicle rear side of the condenser opposite the plurality of spray nozzles, and wherein the rear side air conditioning unit includes a second electric fan provided on the vehicle rear side of the condenser opposite the second plurality of spray nozzles.

* * * * *